United States Patent [19]
Manton et al.

[11] Patent Number: 4,500,958
[45] Date of Patent: Feb. 19, 1985

[54] MEMORY CONTROLLER WITH DATA ROTATION ARRANGEMENT

[75] Inventors: John C. Manton, Marlboro, Mass.; Kenneth Okin, Saratoga, Calif.

[73] Assignee: Digital Equipment Corporation, Maynard, Mass.

[21] Appl. No.: 370,572

[22] Filed: Apr. 21, 1982

[51] Int. Cl.³ .............................................. G06F 13/00
[52] U.S. Cl. ................................................... 364/200
[58] Field of Search ... 364/200 MS File, 900 MS File

[56] References Cited
U.S. PATENT DOCUMENTS
4,296,467 10/1981 Nibby, Jr. et al. ................ 364/200

Primary Examiner—Raulfe B. Zache
Attorney, Agent, or Firm—Cesari and McKenna

[57] ABSTRACT

A memory unit for connection in a data processing system in which the central processor unit may transfer data to or retrieve data from portions of two storage locations in one transfer. The memory unit has a data rotating and storage network that rotates the data and stores it as necessary for its transfer to or from the addressed storage locations.

21 Claims, 33 Drawing Figures

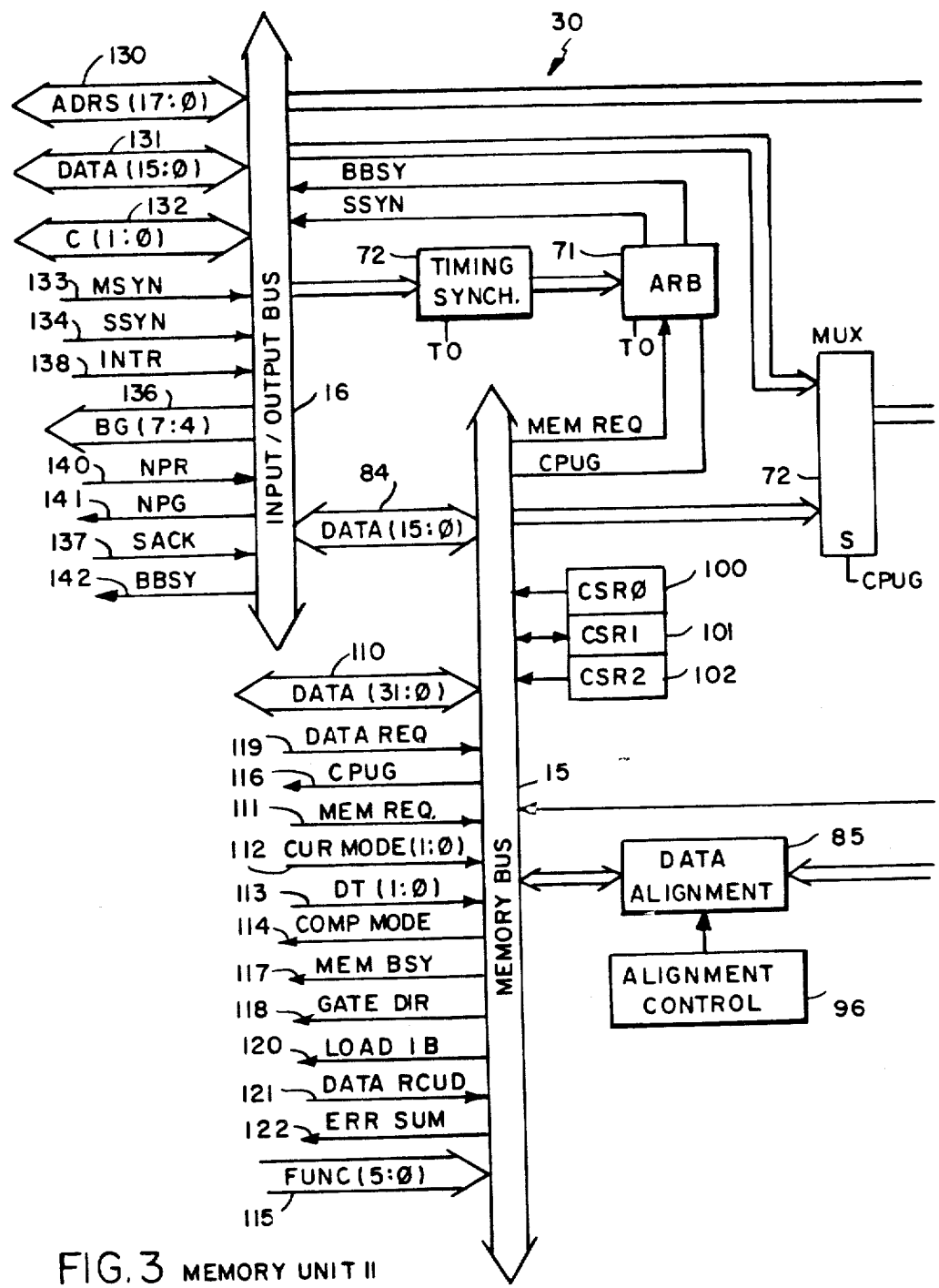
FIG. 3 MEMORY UNIT II

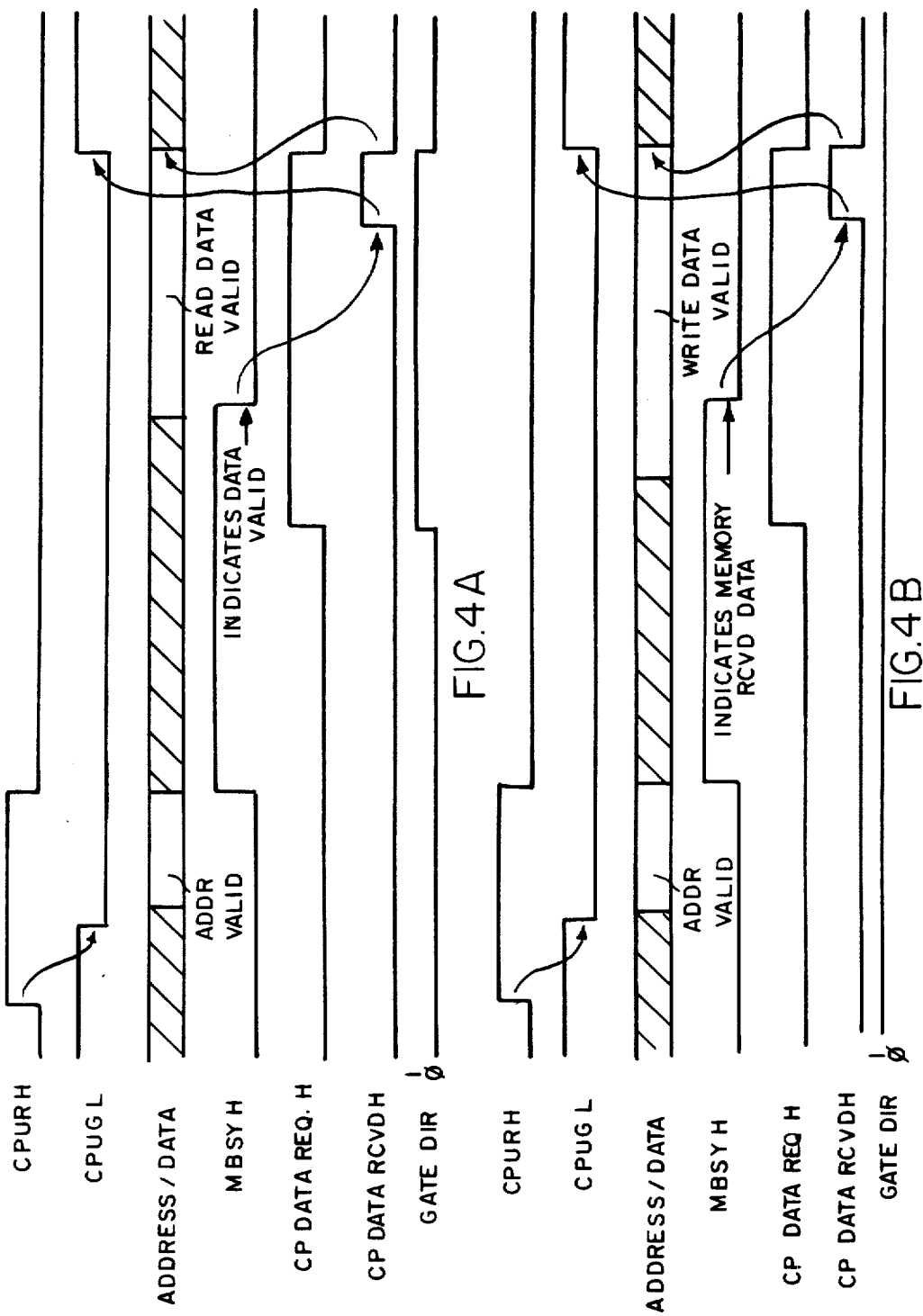

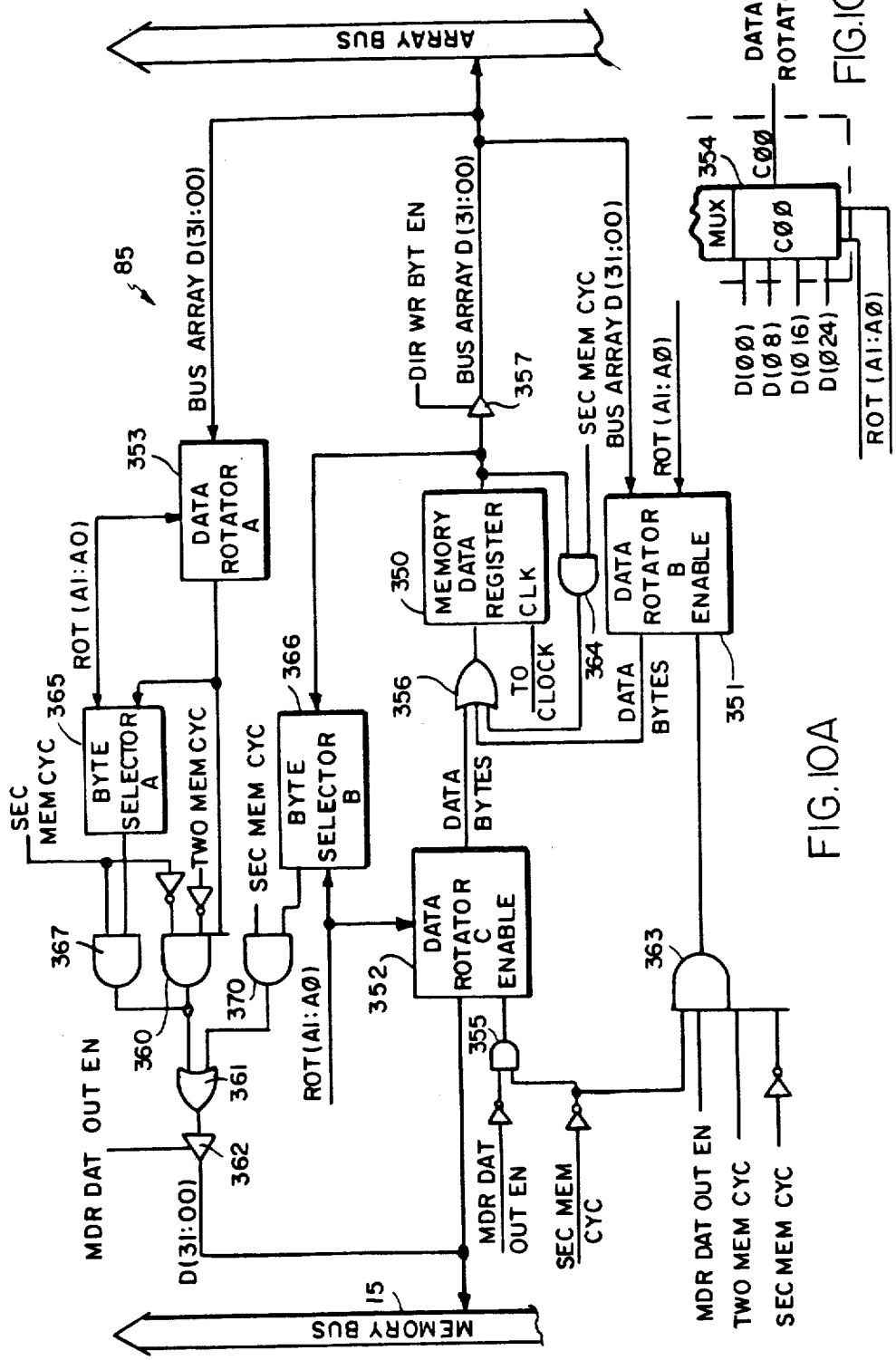

MEMORY OPERATION (I)
↓
TRANSFER DATA THROUGH DATA OUTPUT
LATCH AND ROTATORS ONTO MEMORY BUS
↓
IS DATA REQ ASSERTED? —NO┐
↓ YES
NEGATE MEMBSY
↓
IS DATA RCVD ASSERTED —NO┐
↓ YES
NEGATE CPUG, GATE DIR AND
REMOVE DATA FROM MEMORY BUS
↓
PREPARE ARBITRATION LOGIC TO GIVE
PRIORITY TO REQUEST FROM 1/0 BUS
↓
RETURN TO IDLE, FIG. 11A (T)

↓

SHIFT WRITE DATA THROUGH
ECC LOGIC TO GENERATE
CHECK BITS

↓

SHIFT WRITE DATA INTO
DATA OUT LATCH. NEGATE
MDR TO ARRAY EN SIGNAL

↓

WRITE DATA INTO ARRAY

↓

PREPARE ARBITRATION LOGIC
TO GIVE PRIORITY TO REQUEST
FROM I/O BUS

↓

RETURN TO IDLE, FIG. 11A

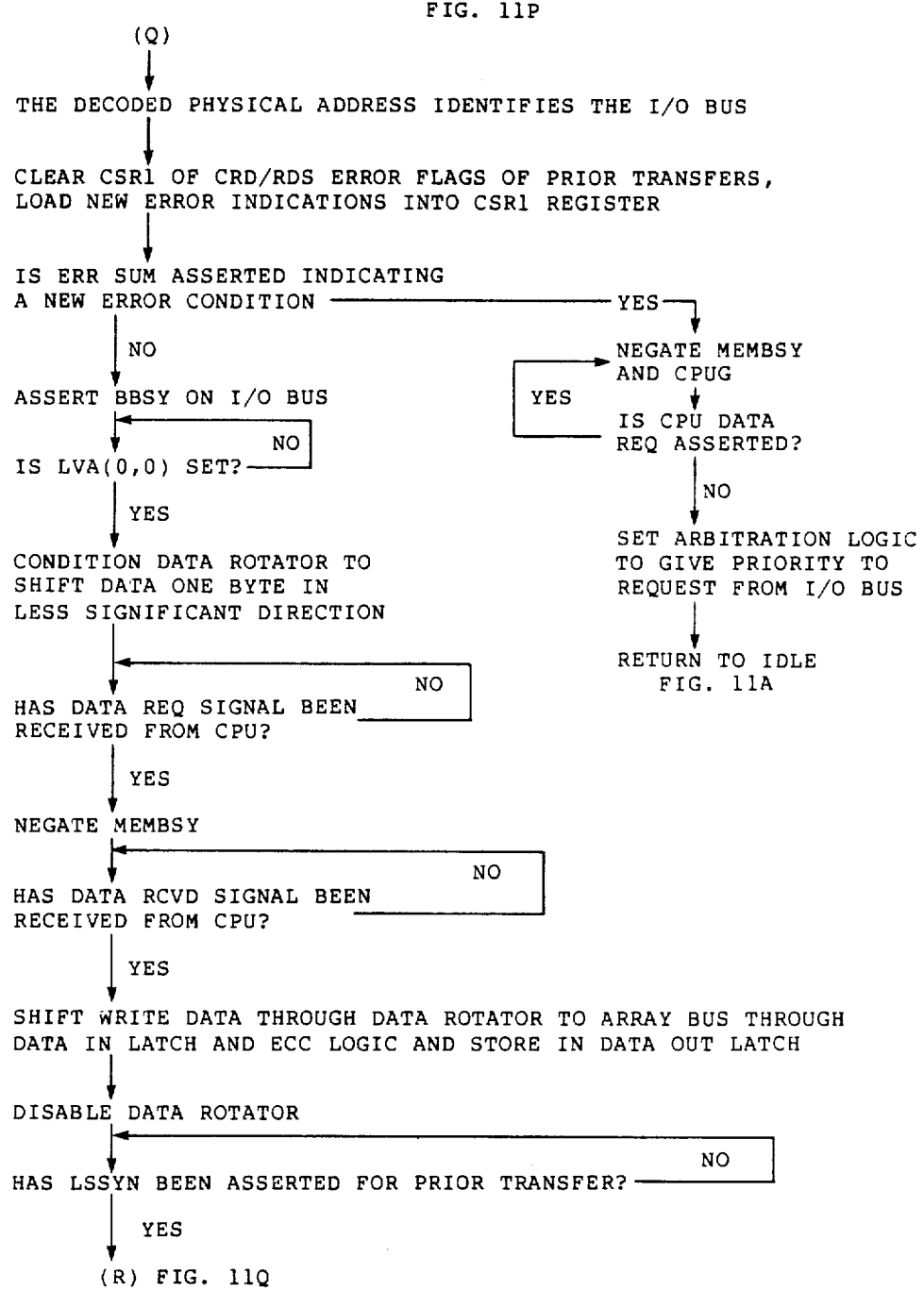

MEMORY CONTROLLER WITH DATA ROTATION ARRANGEMENT

BACKGROUND OF THE INVENTION

1. Field of the Invention

This invention relates to digital data processing systems. More specifically, it relates to a new and improved memory arrangement for use in such a data processing system that increases the flexibility of memory references.

2. Description of the Prior Art

A digital data processing system comprises three elements: namely, a memory element, an input/output element and a processor element. The memory stores information in uniquely-identifiable addressable storage locations. This information includes data and instructions for processing the data. The processor unit transfers information to and from the memory element, interprets the information as either data or instructions, and processes the data in accordance with the instructions. The input/output element also communicates with the memory element in order to transfer data into the system and obtain processed data from it.

The memory element is typically connected to the processor element and the input/output element over one or more busses, which transfers a convenient number of bits of information in parallel. In various systems, eight, sixteen or thirty-two bits of information may be transferred between elements in parallel. The memory element stores this information in a location identified by an address. Often times, in addition to the information from the processor element or the input/output element, the memory element will also store additional bits of information that it generates itself for error checking or correction. This error checking or correction information is used by the memory element when the information is retrieved to determine if an error occurred between the time the information was stored and the time it was retrieved.

The memory element normally stores the entire block of information, plus the error checking or correction information, in one location, and retrieves the information from one location for transfer to the other elements. Thus, if the processor element, for example, desires to store information in only a portion of a location in memory, it must actually store information in the entire location. Furthermore, if the processor element desires to store information in portions of two adjacent locations, it must perform two transfers, with each transfer identifying each location. Similarly, if the processor desires to retrieve information from portions of two adjacent locations, it must perform two transfers, even if the bus could transfer all of the information in one transfer.

As a specific example, suppose the bus between the processor element and the memory element can transfer thirty-two bits of information in parallel, and the memory element stores thirty-two bits in each location, plus the error checking and correction information therefor. In prior arrangements, the processor could not retrieve bits of information stored in the sixteen most significant bits of one location and the sixteen least significant bits of the next higher location in one operation, even though the bus could transfer all thirty-two bits of information at once. Similarly, the processor could not, in one transfer over the bus, store thirty-two bits in the twenty-four most significant bits of one location and eight bits of a next higher adjacent location.

One reason for this inability in prior processors was that if the memory element did store information in only a portion of a memory location, then the error checking and correction information stored with the location would not be useful, as it is uniquely determined for the set of information bits in each location. It would be possible to have the memory element generate error correction or detection bits for each selected subgroup of information bits, but that would increase the complexity of the memory element to accommodate the additional bits that would be generated. However, requiring the processor to perform additional transfers also places additional overhead on the processor element, slowing its operation.

SUMMARY

It is therefore an object of the invention to provide a new and improved data processing system including a memory element that can process transfers with a portion of one storage location or portions of two adjacent storage locations in one transfer.

In accordance with this invention, a new memory element is provided that can process transfers of information with either a portion of one storage location or portions of two adjacent storage locations, in addition to an entire storage location, in response to one transfer operation from the processor element. The memory contains a data rotator that shifts the bits of information such that, during a read operation in which information is transferred to the processor, the desired information from a first storage location is shifted to the least significant portion of the rotator, and the desired information from a second adjacent location is shifted to the most significant portion of the rotator, and the two portions are concatenated for transfer to the processor.

During a write operation, the data rotator shifts the information to be stored in a first storage location into the most significant portion of the rotator, and the information to be stored in the second adjacent storage location into the least significant portion of the rotator. The memory then concatenates the respective information bits with the remaining information bits and generates the error correction and detection bits for each storage location and stores them in the respective memory locations.

BRIEF DESCRIPTION OF THE DRAWINGS

This invention is pointed out with particularity in the appended claims. The above and further objects and advantages of this invention may be better understood by referring to the following description taken in conjunction with the accompanying drawings, in which:

FIG. 4, comprising FIGS. 4A and 4B, depicts a timing diagram detailing sequences of signals for transferring information during a READ operation and WRITE operation, respectively, over the memory bus 15 between the central processor unit 10 and memory unit 11;

FIG. 9, comprising

DESCRIPTION OF AN ILLUSTRATIVE EMBODIMENT

I. General Description

A. Data Processing System

Figure 1:
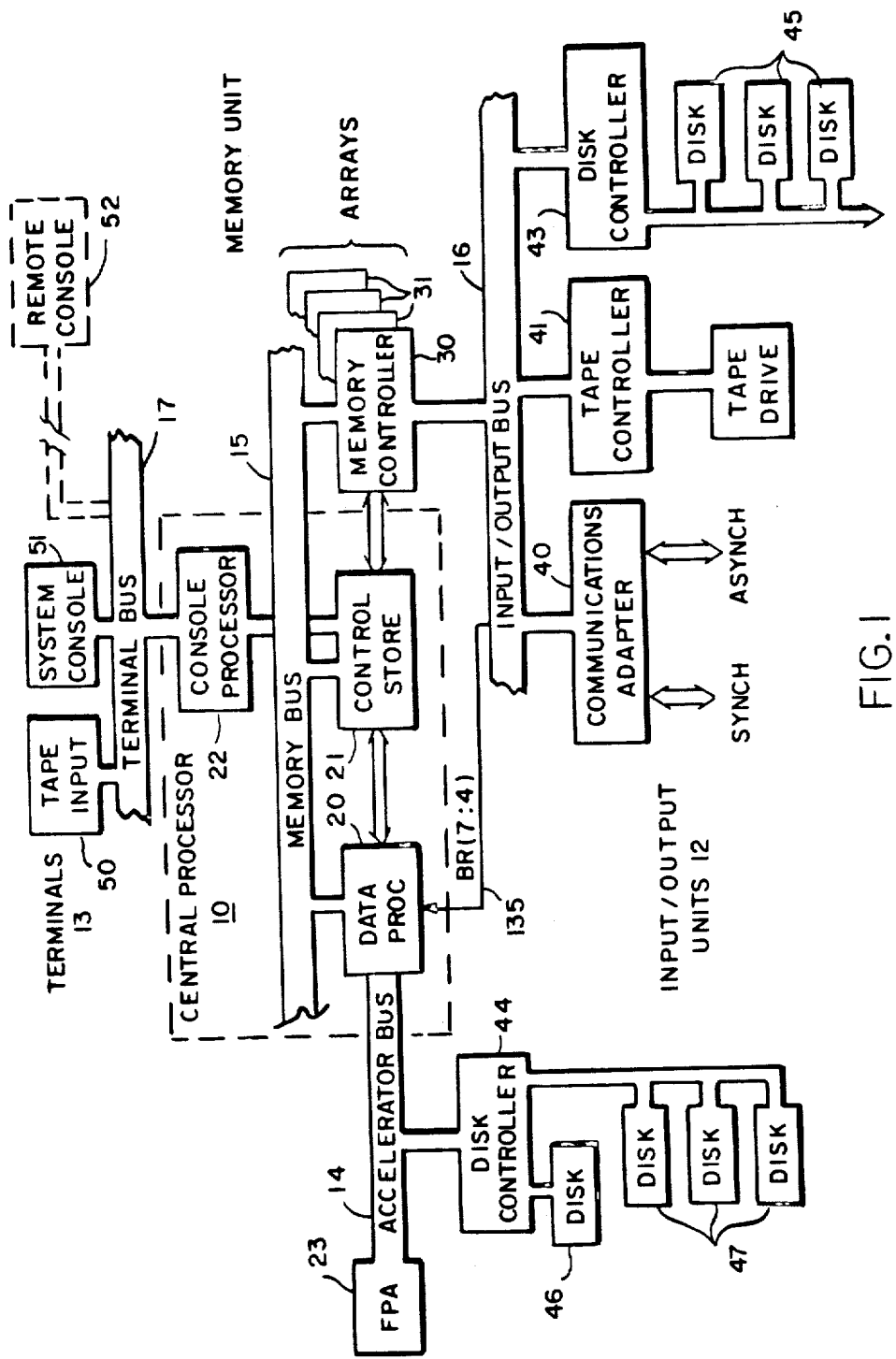
FIG. 1 is a block diagram of a digital data processing system constructed in accordance with this invention.

Referring to FIG. 1, the basic elements of a data processing system that embody this invention comprise a central processor unit 10, memory unit 11, and input/output units 12, which include terminals 13. The central processor unit communicates directly with certain of the input/output units 12 over an accelerator bus 14. The central processor unit 10 communicates with memory unit 11 over a memory bus 15, and the memory unit in turn communicates directly with others of input/output units 12 over an input/output bus 16. The central processor unit 10 communicates with terminals 13 over a terminal bus 17.

The central processor unit comprises a data processor 20, and control store 21 which are connected to memory bus 15, and a console processor 22. The console processor receives signals from terminal bus 17, and transfers them through control store 21 to data processor 20. Data processor 20 then operates on the information from console processor 22 and may transfer the information to the memory unit 11 for future processing, or it may process information directly. Similarly, data processor 20 may transfer information through control store 21 to the console processor 22, which may then transmit the information to terminal bus 17 for transfer to one of terminals 13. The data processor also performs all communications over the accelerator bus 14 with those input/output units 12 connected thereto. The communications with input/output units 12 over accelerator bus 14 are described in copending U.S. patent application Ser. No. 370,506, filed April 21, 1982.

As described below, the data path communicates directly with the memory unit 11 over memory bus 15, and indirectly with the input/output bus 16 through memory unit 11.

The control store 21 contains all of the microinstruction sequences that are used for processing the instructions that are received and executed by data processor 20, and steps through the microinstruction sequences based on sequencing information from the data processor and timing information from a timing signal generator which it maintains.

Memory unit 11 contains a memory controller 30 having one connection, or port, to memory bus 15, and a second connection to input/output bus 16. One or more memory arrays 31 connect to memory controller 30 and contain the addressable memory storage locations that may be accessed directly by the memory controller.

In addition to central processor unit 10, a floating point accelerator processor 23 may be connected to accelerator bus 14. A floating point accelerator processor 23 useful in the data processing system of FIG. 1, and the accelerator bus 14 are described in a copending U.S. patent application Ser. No. 370,390, filed on April 21, 1982. Floating point accelerator processor 23 receives floating point instructions from data processor 20 and is specially designed to process such instructions generally more rapidly than data processor 20 would normally be able to.

Several types of input/output units 12 are shown in FIG. 1. A communications adapter 40 can connect to synchronous and/or asynchronous data communications lines to transfer information over, for example, conventional telephone lines, or to enable connection of the data processing system as one element in a local distributed processing network. Specific signals for the synchronous and asynchronous connection to communications adapter 40 are not shown; however, such signals would depend on the particular signal protocols used in such transmission, and are not a part of this invention. The communications adapter 40 normally would include circuitry for buffering information during the synchronous or asynchronous transfers, and for generating control signals over the synchronous and asynchronous communications paths to enable the information to be transferred. The communications adapter 40 also contains circuitry for transferring information over input/output bus 16. Since the communications adapter forms no part of this invention, it will not be described further herein.

Three other input/output units 12 provide a secondary storage facility for the data processing system. They include a tape controller 41 connected to a tape drive 42, and two disc controllers 43 and 44. Disc controller 43 is connected to a plurality of disc drives 45, while disc controller 44 may be connected to a disc drive 46 and to a plurality of disc drives 47. Disc controller 44 is connected to accelerator bus 14, and is described in the aforementioned copending U.S. patent application Ser. No. 370,506, filed April 21, 1982. Units 41 and 43, and their respective storage elements may be constructed as described in U.S. Pat. No. 3,999,163.

In one specific embodiment of the data processing system of FIG. 1, the input/output bus is constructed in accordance with U.S. Pat. No. 3,710,324, which describes in detail the signals required to transfer information thereover. These signals are only briefly described herein, and reference should be made to that patent for a detailed explanation.

Terminals 13 may include a tape drive 50 and a system console 51, which are directly connected to terminal bus 17. An optional remote console 52 may be provided to transfer signals with terminal bus 17 over telephone lines through conventional modems (not shown). The remote console 52 can be used for remote diagnosis of system failures or for remote maintenance. The tape drive 50 may be used for local maintenance or for transferring information into or out of the system. The system console may be used to provide direct operator control of the system, and may permit the operator to turn the system on or off, to initialize the system, and to step through a program sequence step-by-step.

Before proceeding further, it may be useful to establish some definitions for terms that have already been used and will be used throughout the remainder of this description.

"Information" is intelligence that controls and provides the basis for data processing. It includes address, data, control and status information.

"Data" includes information which is the object of or result of processing.

"Address" information identifies a particular storage location in which other information, such as data information, control or status information or other address information, is stored.

"Control" information identifies particular operations to be performed. It includes commands between units of a data processing system that certain operations be performed, instructions to be performed by the central processor 10 or floating point accelerator processor 23, and it also includes information that modifies a unit's performance of an operation or execution of an instruction so as to enable certain actions to occur or disable actions from occurring.

An "instruction" is a step in a program that is executed by the central processor unit 10 or floating point accelerator processor 23. Each step may be executed by the respective processor executing one or more microinstructions. Each microinstruction is stored in a specific location, which is identified as a micro-address. Other units, for example, memory controller 30, also perform operations in response to and as defined in sequences of microinstructions.

"Status" information identifies the condition of various signals generated by a unit at various times during the processing of an operation or execution of an instruction.

B. Central Processor Unit 10

Figure 2:
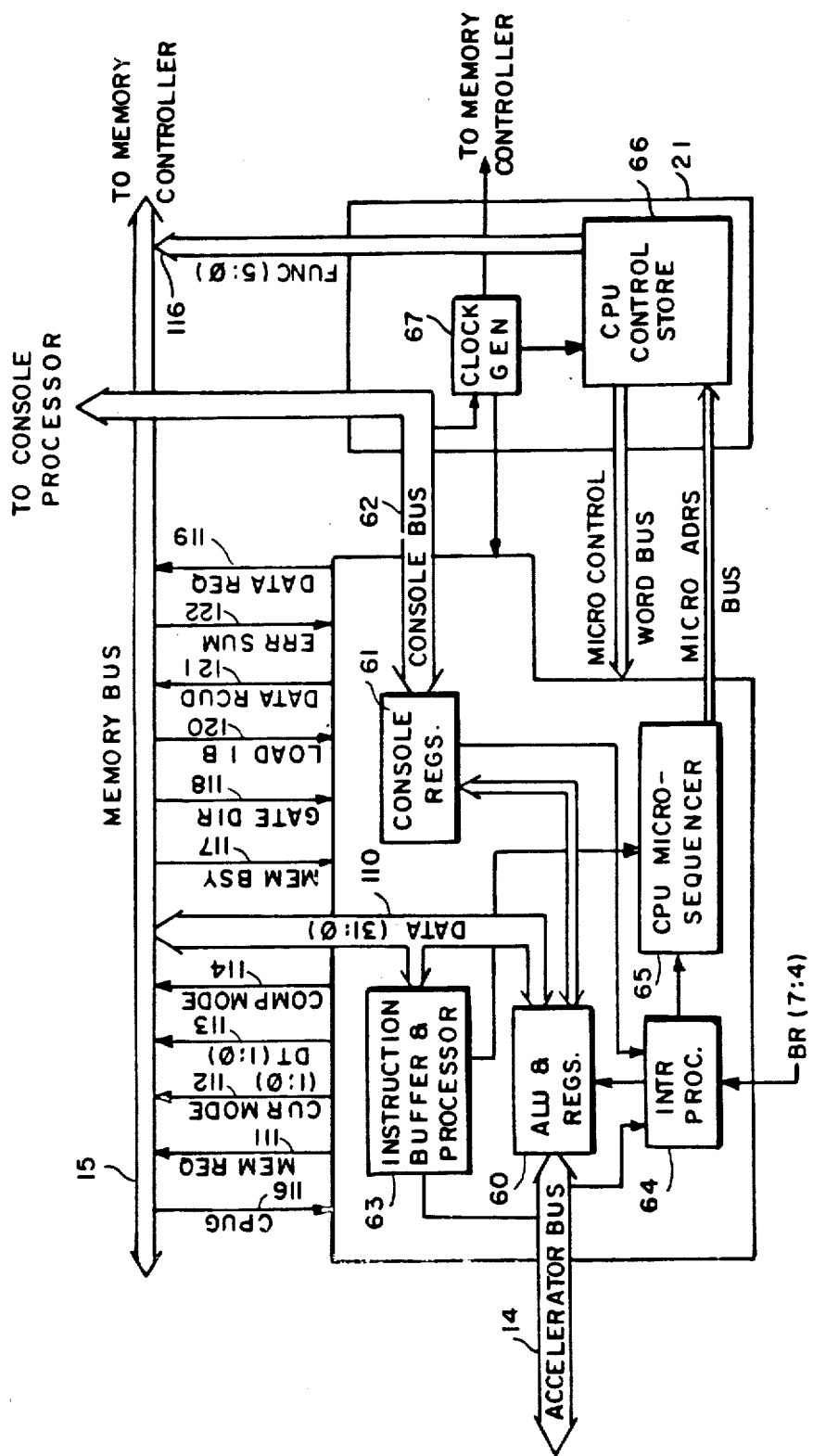
FIG. 2 is a detailed block diagram of a portion of the central processor unit 10 shown in FIG. 1.

FIG. 2 illustrates, in general block diagram form, portions of central processor 10, including data processor 20 and control store 21, that may be useful in the data processing system of FIG. 1.

Data processor 20 includes a data path 60 that includes an arithmetic and logic unit and a plurality of general purpose registers (not shown). In one specific embodiment of this invention, one of the general purpose registers is used as a program counter to identify the storage location containing the next instruction to be executed by the processor 10 and another register is used as a stack pointer used during the servicing of interrupts and subroutines, as described in U.S. Pat. No. 3,710,324. The data path 60 receives information from, or transfers information to, the accelerator bus 14, the memory bus 15, or from a plurality of console registers 61 that in turn receive and store information from, or transfer information to, console processor 22 over a console bus 62.

Operations performed by data path 60 are under the control of instructions stored in an instruction buffer 63, which receives each instruction fetched from memory unit 11 identified by the program counter register in data path 60. Alternatively, the operations performed by data path 60 can be controlled by an interrupt processor 64 which receives requests for interrupt service from accelerator bus 14, console bus 62 (through console registers 61) and from the input/output bus 16. The interrupt processor 64 also receives the interrupt priority level at which the processor 10 is then operating and, if the interrupt request has a higher priority, acknowledges the interrupt and causes the processor 10 to service the interrupt request. A microsequencer 65 generates a microaddress that is used by a micro-control store 66 in control store 21 to access a microinstruction depending on the instructions stored in instruction buffer 63, or the interrupt being serviced by interrupt processor 64. The microsequencer 65 generates the microaddress in response to the particular instruction in instruction buffer 63 then being processed, and the acknowledgement of an interrupt by interrupt processor 64, as well as timing signals generated by a clock generator 67 in control store 21.

C. Memory Units 11

Figure 3:
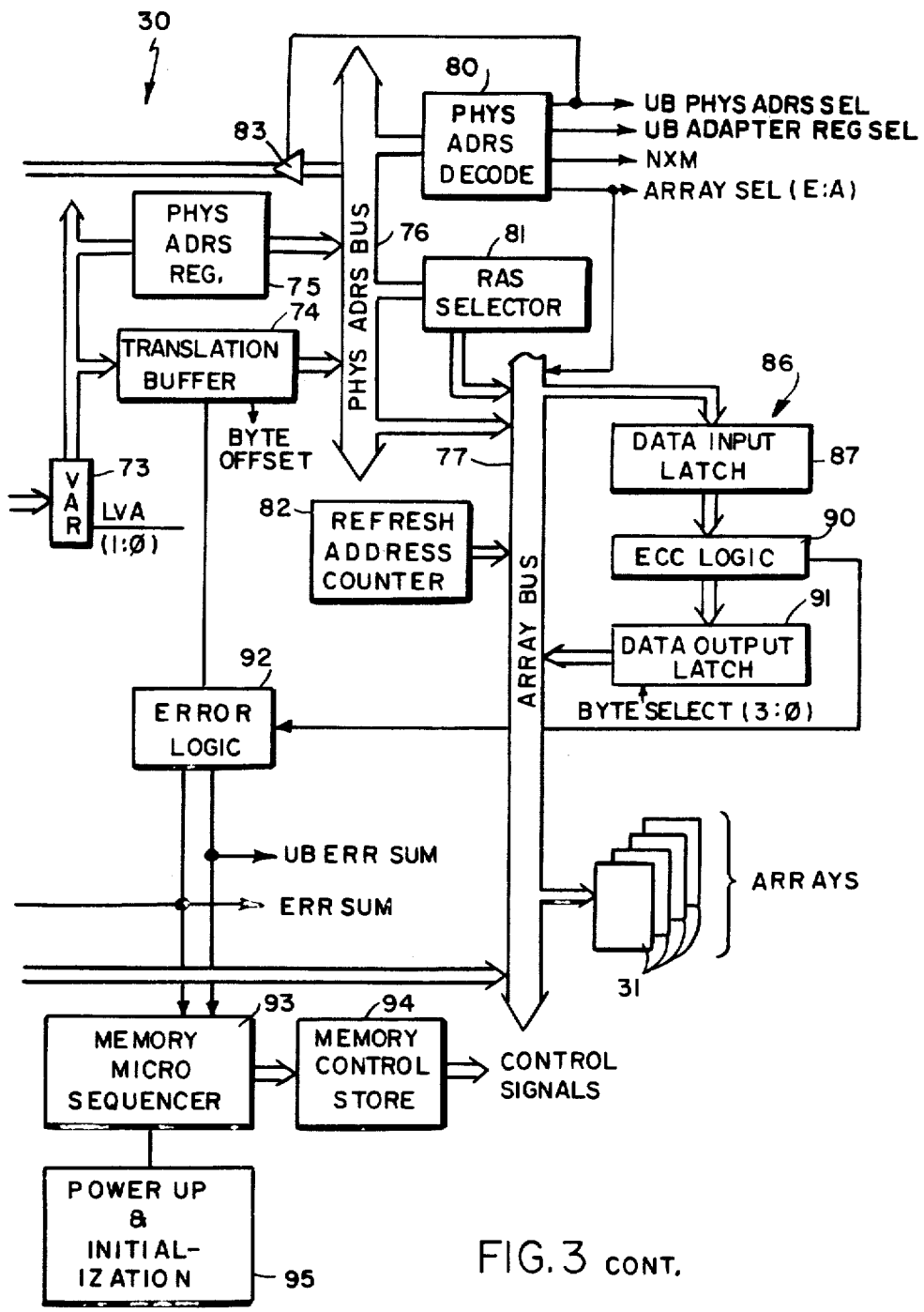
FIG. 3 is a detailed block diagram of the memory unit 11 shown in FIG. 1.

With reference to FIG. 3, a general block diagram of memory unit 11 is shown in FIG. 3, including the memory controller generally identified at 30, and the memory arrays 31.

As was mentioned above, both units connected to input/output bus 16 and the central processor unit 10, over memory bus 14, can transfer information with memory unit 11; however, both cannot do so at the same time. The determination of whether the memory controller 30 will accept signals from the input/output bus 16 or memory bus 14 is made by arbitration logic 71 which receives request signals from input/output bus 16 through a timing synchronizer 72, and from the memory bus 14. The arbitration logic 71 generates appropriate signals acknowledging the transfer attempt to either input/output bus 16 or memory bus 14 and indicating that it will recognize and process the acknowledged transfer attempt. The transfer attempt that is not acknowledged must be attempted later.

When arbitration logic 71 acknowledges the transfer attempt from one of busses 14 or 16, it conditions a multiplexer 72 to couple an address from the acknowledged bus to a virtual address register 73, which stores the address. One specific embodiment of the memory controller 30 normally uses virtual addresses, which are translated in a translation buffer 74. At certain times, however, for example, during a power-up sequence, the memory controller 30 may receive physical addresses from memory bus 14. The physical addresses are not translated, but are stored in a physical address register 75. The translated address from translation buffer 74, or the address from physical address register 75, is coupled to a physical address bus 76 for transfer to either array bus 77 or to the input/output bus as explained hereinafter.

Also connected to the physical address bus 76 is a physical address decoder 80 which receives the translated address signals from translation buffer 74 or the physical address from physical address register 75, and identifies the physical location identified by the physical address. The translated physical address may identify a location in one of the multiple arrays 31, in an addressable location in input/output units 12 that must be accessed over input/output bus 16, or it may identify addressable locations in memory controller 30 itself, or it may constitute addresses for which no locations are provided in the specific embodiment described herein. In one specific embodiment, a selected maximum number of arrays 31 may be connected to controller 30, even though many more addressable locations may theoretically be identified by an address. The physical address decoder 80 tansmits an ARRAY SEL (E:A) array select signal in the event that an addressable location on one of the five memory arrays 31 is identified. If the physical address identifies a location that must be accessed over the input/output bus, decoder 80 transmits an UB PHYS ADRS SEL input/output bus physical address select signal. Alternatively, the physical address decoder 80 transmits an NXM non-existent memory signal if the translated physical address identifies a storage location which is not provided in the specific embodiment of the system, or a UB ADAPTER REG SEL input/output bus adapter register select signal in the event addressable locations in memory controller 30 are identified by the physical address.

As shown in FIG. 3, a RAS (row address signal) selector 81 is also connected to the physical address bus 76 to receive the address signals. RAS selector 81 transmits signals onto the array bus 77 that, with the ARRAY SEL (E:A) array select signal, enable the arrays 31 to receive and decode the physical address on the array bus. The address signals from array bus 77 are received by arrays 31 in two portions, denominated row address signals and column address signals. The RAS selector 80, on determining that the address signals on the array bus 77 are stable, transmits a signal onto array bus 77 that is received by arrays 31 enabling the arrays to receive and decode the row address signals from array bus 77. A predetermined time later, as determined by the particular physical circuits comprising arrays 31, RAS selector 81 also transmits a column address signal which enables arrays 31 to receive those address signals constituting the column address, that are also transmitted over array bus 77. This process of sequentially transferring address signals constituting the row address and column address is known in the art and is not described further herein.

In addition to the address signals from physical address bus 76, address signals may also be transferred to array bus 77 from a refresh address counter 82. Refresh address counter 82 transmits row address signals only, which enable a refresh of an entire portion of arrays 31 at a time. The refresh operation is known in the art, and also will not be described further herein.

As explained below in connection with FIG. 11, when the physical address from the central processor unit 10 identifies an addressable location on the input/output bus 16, memory controller 30 initiates a transfer over input/output bus 16. Central processor unit 10 may then communicate with addressable storage locations in units connected to input/output bus 16 by initiating a memory operation, for example, a read or write operation, by memory controller 30, in which the address identifies a location on the input/output bus. The physical address from physical address bus 76 is transmitted to input/output bus 16 through a driver 83, when enabled by the UB PHYS ADRS SEL input/output bus physical address select signal from physical address driver 83. Thus, the physical address is transmitted from physical address bus 76 to arrays 31 when it identifies an array location, and to input/output bus 16 when it identifies a location that must be accessed thereover.

Data, that is, information that is to be stored in or retrieved from arrays 31, may be coupled from the one of input/output bus 16 or memory bus 14 from which the virtual address had been received, into memory controller 30. The data transferred over input/output bus 16 is transferred first to and from respective data lines of memory bus 14 over a transfer bus 84 through conventional receivers and drivers (not shown). The data is shifted between memory bus 14 and array bus 77 through a data alignment logic 85, which is described in more detail below.

Memory controller 30 further includes an ECC error correction and detection network 86, comprising a data input latch 87, ECC logic 90, and data output latch 91. ECC network 86, with array bus 77, forms a loop in which data is shifted from array bus 77, through data input latch 87, ECC logic 90 and data output latch 91, and back to array bus 77.

The ECC logic 90 serves to generate error correction check bits which are appended to the data prior to being written into the arrays 31. ECC logic 90 also uses the check bits to determine if there is an error in data retrieved from the arrays 31, and to correct certain types of errors, by conventional techniques.

Data output latch 91 is divided into sections, each of which is individually actuable to store a portion (specifically, one byte) of data.

At this point, it may be helpful to briefly describe the actual flow of data through memory controller 30, in response to a memory operation initiated by a command from central processor unit 10 or a unit connected to input/output bus 16.

Data transferred from central processor unit 10 to memory controller 30, in an operation in which the address identifies a location in arrays 31, is transmitted over memory bus 14 and through data alignment logic 85, where it may also be stored therein, as described in connection with FIG. 10. The data is transferred onto array bus 77 and stored in ECC network 86. Specifically, the data is transferred through data input latch 87, ECC logic 90, and stored in data output latch 91. The data is then transferred from data output latch 91, back through data input latch 89, and ECC logic 90 to generate the error correction check bits, data output latch 91, and is stored in the addressed location.

As has been mentioned above, memory controller 30 can accept memory transfers in which the data is written into adjacent bytes of two contiguous storage locations. The memory controller performs this by first retrieving the contents of one of the storage locations onto the array bus 77 and shifting them through data input latch 87, ECC logic 90 and storing them in data output latch 91.

The bytes of data to be stored in this location are then shifted from the data alignment logic 85 to array bus 77, through data input latch 87 and ECC logic 90 and are stored in the particular byte locations in data output latch 91. The data alignment logic, in addition to storing the data immediately received from memory bus 14, also repositions the bytes of data among the byte positions available for transfer. Thus, in one specific embodiment in which four bytes of data can be simultaneously transferred from central processor unit 10 over memory bus 14, to be stored in one most significant byte of one storage location and three least significant bytes of the next higher contiguous storage location, the data alignment logic repositions the bytes of data received from the central processor unit 10 so that the one byte of data to be stored in the one storage location is transmitted on particular lines onto array bus 77 and stored in the most significant byte location of data output latch 91. The data alignment logic also repositions the remaining bytes of data so that they will be stored in the three least significant byte locations of data output latch 91.

After the least significant bytes of data are stored in data output latch 91, the memory controller 30 shifts the contents of latch 91 onto array bus 77, through data input latch 87 and ECC logic 90 to generate the ECC check bits, and transfers the data to the initial storage location over array bus 77. The memory controller 30 then reads the contiguous higher-addressed location and performs the same operation with the remaining bytes of data from data alignment logic 85. The memory controller also performs the same operation in connection with transfers from input/output bus 16 of data to be stored in arrays 31.

In some circumstances, memory controller 30 may be required to reposition the bytes of data received from a central processor unit, but may not have to access two storage locations in arrays 31 to complete the required operation. This condition may arise, for example, if the central processor unit 10 transfers only two bytes of data over memory bus 14 to be written into the two most-significant bytes of a storage location. Data alignment logic 85 still must reposition the bytes of data, which it receives in the two least significant byte positions, so as to be able to transfer them to the most significant byte locations of data output latch 91.

The data alignment logic 85 also serves to reposition bytes of data during a read operation from arrays 31. If one access to arrays 31 is required to complete the transfer, the contents of the addressed location are shifted onto array bus 77, through data input latch 87, ECC logic 90 and are stored in data output latch 91. The contents of the data output latch are then shifted back onto array bus 77 and into alignment logic 85. The alignment logic repositions the bytes from data output latch 91, if necessary, so that the particular data bytes that are being retrieved by the central processor unit 10 are transmitted over the least significant bytes of memory bus 14. If the central processor unit 10 is retrieving only the two most significant bytes of a storage location in arrays 31, the data alignment logic 85 receives the contents of data output latch 91 and repositions them to transfer the desired most significant bytes onto the least significant lines of memory bus 14.

If the memory controller 30 must retrieve the contents of a second memory array location to complete a read operation, the data alignment logic 85 repositions the data retrieved during the first retrieval and stores it therein. The memory controller then retrieves the contents of the second array location, transfers them through the ECC network 86 into the data alignment logic 85. The data alignment logic then repositions the desired bytes from the second location and concatenates them with the desired bytes from the first location, and then transfers them over memory bus 14 to central processor unit 10.

If the physical address identifies a location connected to input/output bus 16, during a read operation the data is transferred from input/output bus 16 to memory bus 14 over transfer bus 84, and through the data alignment logic 85, without repositioning, and is stored in ECC network 86. The data is then transferred back through data alignment logic 85, in which it may be shifted to position it on the least significant lines of memory bus 14 for transfer to central processor unit 10. For a write operation in which the physical address identifies a location connected to input/output bus 16, data from the central processor unit 10 is transmitted to the memory controller 30 over memory bus 14. The data is transferred through data alignment logic 85 without change and stored in ECC network 86, specifically in the data output latch 91. The data is then transferred onto array bus 77 and through data alignment logic, again without being repositioned, onto memory bus 14. The data is then transferred over transfer bus 84 to input/output bus 16, over which it is transferred to the addressed location.

With reference again to FIG. 3, both translation buffer 74 and ECC logic 90 generate error signals which are received in an error logic 92. The translation buffer may generate an error signal if the physical address, after being translated, does not meet certain conditions. For example, certain portions of the memory may be written into or retrieved only by certain types of programs, and attempts to address these locations will result in an error signal being asserted. The ECC logic 90 transmits an error signal in the event that it detects an error in the data retrieved from an array location, as determined by the check bits. The ECC logic may determine that the error can be corrected or that it cannot be corrected, by means known in the art, and can also transmit a signal indicating whether the error was corrected or whether it was not correctable.

The error logic 92 asserts an ERR SUM error summary signal which is transmitted to memory bus 14 and to a memory microsequencer 93, which signal indicates that an error has been detected while the memory controller 30 was processing a command from the central processor unit 10. Alternatively, error logic 92 generates an UB ERR SUM input/output bus error summary signal, which is transmitted only to memory microsequencer 93. This signal indicates that an error has been detected while the memory controller 30 was processing a command that was received from the input/output bus 16.

Memory microsequencer 93 generates microaddress signals that are transmitted to a memory control store 94, which in turn transmits microinstruction signals that control the operations of memory controller 30 as it steps through the various sequences for processing the commands from memory bus 14 and from the input/output bus 16. Several of these sequences are described below in reference to FIG. 11. The memory microsequencer receives signals representative of conditions in memory controller 30 as well as of signals from the input/output bus 16 and the memory bus 14, and generates microinstruction address signals in response thereto to step the memory control store through the proper sequences to execute the commands. A power-up and initialization logic 95 is provided to initialize the circuitry in the memory controller 30 during power-up in a manner known to those skilled in the art.

Three control and status registers CSR0 100, CSR1 101, and CSR2 102 are provided to store control information used by the memory controller in executing a command, and to store status information representing the condition of certain signals generated by the memory controller 30 that indicate its status. The interpretation of the signals stored in these registers will be described in more detail below with respect to FIG. 8.

II. Specific Description

1. Transfers Over Memory Bus 14 and Input/Output Bus 16.

At this point it may be helpful to describe the particular signals transferred over memory bus 14 and input/output bus 16, and the sequence of signals used to transfer data over each. Memory bus 14 and input/output bus 16 comprise a number of conductors that, respectively, transfer signals to and from central processing unit 10 in the case of memory bus 14, and to those of input/output units 12 connected to input/output bus 16. FIG. 3 identifies the conductors, which are identical to the names of the signals they carry, in each of these buses 14 and 16. Input/output bus 16 also includes several conductors for transferring interrupt request signals directly to central processor unit 10.

In one specific embodiment, the memory bus 14 comprises the following conductors for carrying the indicated signals:

DATA lines D (31:00), indicated at 110 are bidirectional lines that transfer both address information from central processor unit 10 to memory controller 30, and data information between central processor unit 10 and memory controller 30.

A MEM REQ memory request conductor 111 carries a MEM REQ memory request signal that is asserted by the data processor unit 10 to initiate a memory operation with the central processor unit.

CURR MODE (1:0) conductors 112 carry a binary coded CURR MODE signal that identifies the current mode of operation of the central processor unit 10. The CURR MODE signal indicates whether the central processor unit is processing a kernel program, an executive program, a supervisor program, or a user program. The memory controller 30 uses this information to determine whether the transferred address identifies a privileged location in memory that cannot be accessed by the program then being executed.

Data type lines DT (1:0) 113 carry a DT data type binary-coded signal that identifies whether the data being transferred constitutes a byte, a word or a longword.

A COMP MODE line 114 carries a COMP MODE compatibility mode signal that is asserted by the central processor unit to indicate that the processor is executing a particular type of program.

FUNC (5:0) lines 115 carry FUNC (5:0) signals that are asserted by the central processor unit 10 to identify the specific type of command, such as READ or WRITE, or other types of commands that can be executed by memory controller 30. The various commands that are performed by one specific embodiment of memory controller 30 include variations of the READ and WRITE commands including checking of the written or read data, lock operation, transfers to and from the control and status registers 100-102, and so forth. The memory controller 30 also issues the interrupt service grant signals to units connected to input/output bus 16. The specific operations of memory controller 30 are described herein with respect only to READ and WRITE operations, as a description of the other operations are not necessary to an understanding of this invention.

A CPUG line 116 carries a CPUG grant signal to indicate that the memory controller 30 will accept a command and address from the central processor unit 10.

A MEM BSY line 117 carries a MEM BSY memory busy signal that, when asserted by the memory controller 30, indicates that the memory controller is in the process of executing a command and is then unable to accept a new command. The memory controller 30 negates the MEM BSY memory busy signal, during a read operation, to indicate that the data on the DATA D (31:00) lines 110 are valid and can be received by the central processor unit 10. During a write operation, the memory controller 30 negates the MEM BSY memory busy signal to indicate that it has received the data from the DATA lines D (31:00) 110.

A GATE DIR line 118 carries a GATE DIR gate direction signal that is asserted by memory controller 30 to indicate that the DATA lines D (31:00) 110 are carrying signals to the central processor unit 10. The central processor unit 10 uses the GATE DIR direction signal to condition receivers connected to memory bus 15 to receive the data from the DATA lines D (31:00) 110.

A DATA REQ line 119 carries a DATA REQ data request signal that is asserted by central processor unit 10 to request transfer of read data during a read operation.

A LOAD IB line 120 carries a LOAD IB load instruction buffer signal asserted by the memory controller 30 during a fetch operation in which an instruction is being retrieved. This signal conditions the central processor unit 10 to load the signals transferred over the DATA lines D (31:00) 110 in the instruction buffer 63 (FIG. 2).

A DATA RCVD line 121 carries a DATA RCVD data received signal that is asserted by central processor unit 10 to indicate that it has received READ data from the DATA lines D (31:00) 110 during a read operation. During a WRITE operation, the central processor unit 10 asserts the DATA RCVD signal to indicate that it has received the negation of the MEM BSY memory busy signal. The central processor unit 10 then removes the WRITE data from the DATA lines D (31:00) 110.

An ERR SUM line 122 carries an ERR SUM error summary signal that is asserted by the memory controller 30 to indicate that one or more error conditions has been detected by memory controller 30 during execution by it of a command from central processor unit 10. Specifically, the assertion of the ERR SUM error summary signal indicates that one or more of the stages of the control and status registers CSR0 100, CSR1 101 and CSR2 102 that indicate error conditions, have been set.

FIGS. 4A and 4B contain timing diagrams depicting the sequences of signals that are transferred over memory bus 14 during a READ operation and a WRITE operation respectfully, to enable a transfer of address and data information. The signals that are not set forth on FIGS. 4A and 4B are transferred as explained below.

To initiate a memory operation, the central processing unit 10 asserts the MEM REQ memory request signal. If the memory controller 30 will accept a command from the central processing unit 10, as explained below, arbitration logic 71 (FIG. 3) asserts the CPUG grant signal. The processor then transmits a virtual address over the DATA lines D (31:00) 110, and transmits the CURR MODE (1:0) current mode and COMP MODE compatibility mode signals, as well as the DT (1:0) data type signal indicating the number of bytes to be transferred, and the FUNC (5:0) command signals identifying the operation to be performed, and negates the MEM REQ signal.

With the negation of the MEM REQ memory request signal, the memory controller 30 couples the address through the multiplexer 72 (FIG. 3) and loads it into virtual address register 73. The translation buffer 74 then proceeds to translate the virtual address. Memory controller 30 also receives the mode signals and the DT (1:0) data type signals and couples them to memory microsequencer 93 (FIG. 3). The memory controller 30 then asserts the MEM BSY memory busy signal and prepares to execute the command.

If the command is a READ command, the central processing unit 10 asserts the DATA REQ data request signal when it is ready to receive the READ data. The memory controller 30 asserts the GATE DIR signal to condition the receivers of the central processor unit 10 to receive the READ data signals that are returned over the DATA lines D (31:00) data 110 of memory bus 14. The memory controller then transfers the data signals over the data lines and negates the MEM BSY memory busy signal. The central processor asserts the DATA RCVD data received signal to indicate that it has received the data. The memory controller 30 then negates the CPUG grant signal. On the negation of the DATA RCVD data received signal, the DATA REQ data request signal and GATE DIR gate direction signals are asserted, and the data signals are removed from the DATA lines D (31:00) 110.

If the command is a WRITE command, the GATE DIR gate direction signal is not asserted. The central processor unit 10 asserts the DATA REQ data request signal, and a predetermined time thereafter couples the write data onto the DATA lines D (31:00) 110. The memory controller 30 then negates the MEM BSY memory busy signal. In response, the processor asserts the DATA RCVD data received signal. The memory controller 30 then negates the CPUG grant signal. On the negation of the DATA RCVD data received signal, the processor also negates the DATA REQ request signal, and removes the data signals from the DATA lines D (31:00) 110.

The signals transferred over input/output bus 16 in one specific embodiment of memory controller 30 are described in the aforementioned U.S. Pat. No. 3,710,324, and will be described only briefly here. The input/output bus 16 requires a bus controller to operate as an arbitrator for bus access, and memory controller 30, in response to certain commands from central processor unit 10, serves as the bus controller for the input/output bus. The input/output bus comprises the following lines for transferring the indicated signals:

ADRS (17:00) address lines 130 are lines which carry address signals in either direction, that is from driver 83 (FIG. 3) or to multiplexer 72 and virtual address register 73.

Data lines D(15:00) 131 carry data signals to or from memory controller 30. The data signals from input/output bus 16 are coupled onto the low-order lines of the DATA lines D(31:00) 110 of memory bus 14 over transfer 84 (FIG. 3).

C(1:0) lines 132 carry C(1:0) command signals which identify the operation to be performed, that is, READ or WRITE, and also indicates the number of bytes to be transferred. During a READ operation initiated by any unit connected to input/output bus 16, including memory controller 30, the READ data constitutes two bytes of data that are transferred over the DATA lines D(15:00) 131. During a WRITE operation, the transmitting unit can transmit one or two bytes of WRITE data, depending on the condition of the C(1:0) lines.

An MSYN line 133 carries an MSYN master synchronization control signal which indicates that address and control signals have been coupled onto the ADRS (17:00) address lines 130 and C(1:0) lines 132 respectively. During a write operation, the MSYN master synchronization control signal also indicates that data signals have been coupled onto the DATA lines D(15:00) 131.

An SSYN line 134 carries an SSYN slave synchronization control signal which is the response of the unit identified by the ADRS address signals to the MSYN master synchronization control signal. This signal indicates that the ADRS (17:00) and C(1:0) signals have been received, and that the WRITE data signals have been received on the DATA lines D(15:00) 131, or that READ data has been coupled onto the DATA (15:00) lines.

Four BR (7:4) lines 135 (FIG. 1) are four lines each of which carries one of the BR (7:4) interrupt request signals, which are coupled directly to central processor 10. In response to a BR (7:4) interrupt request signal, the memory controller 30 energizes one of the BG (7:4) lines 136 (FIG. 3) to assert a BG (7:4) bus grant signal, on a command therefor from the central processor unit 10.

In response to the receipt of a BG (7:4) bus grant signal over one of the BG (7:4) lines 136, a unit which receives the BG (7:4) signal energizes a SACK line 137 to assert a SACK acknowledgement signal. It also simultaneously energizes an INTR line 138 to assert an INTR interrupt signal which indicates that the interrupting unit still requires interrupt service by central processor unit 10. The interrupting unit then transfers its interrupt vector over DATA lines D(07:00) 131.

An input/output unit 12 that is connected to input/output bus 16 energizes an NPR line 140 to assert an NPR non-processor request signal when it desires to make a data transfer over input/output bus 16, which is not an interrupt transfer or a transfer requiring or relating to central processor unit 10. Memory controller 30 energizes an NPG line 114 to assert an NPG non-processor grant signal to enable the unit asserting the NPR non-processor request signal to engage in a data transfer over input/output bus 16.

A BBSY line 142 is a bidirectional line that carries a BBSY bus busy signal asserted by any unit connected to input/output bus 16 to indicate that it is in the process of making a transfer over the ADRS (17:00) address lines, data (15:00) data lines and C(1:0) control lines. The memory controller 30 may also assert the BBSY bus busy signal when it is in the process of executing certain commands from central processor unit 10. Similarly, the memory controller 30 asserts the MEM BSY memory busy signal (FIG. 3) when it is in the process of performing an operation over input/output bus 16.

2. Virtual Address Translation

Figures 5, 6:
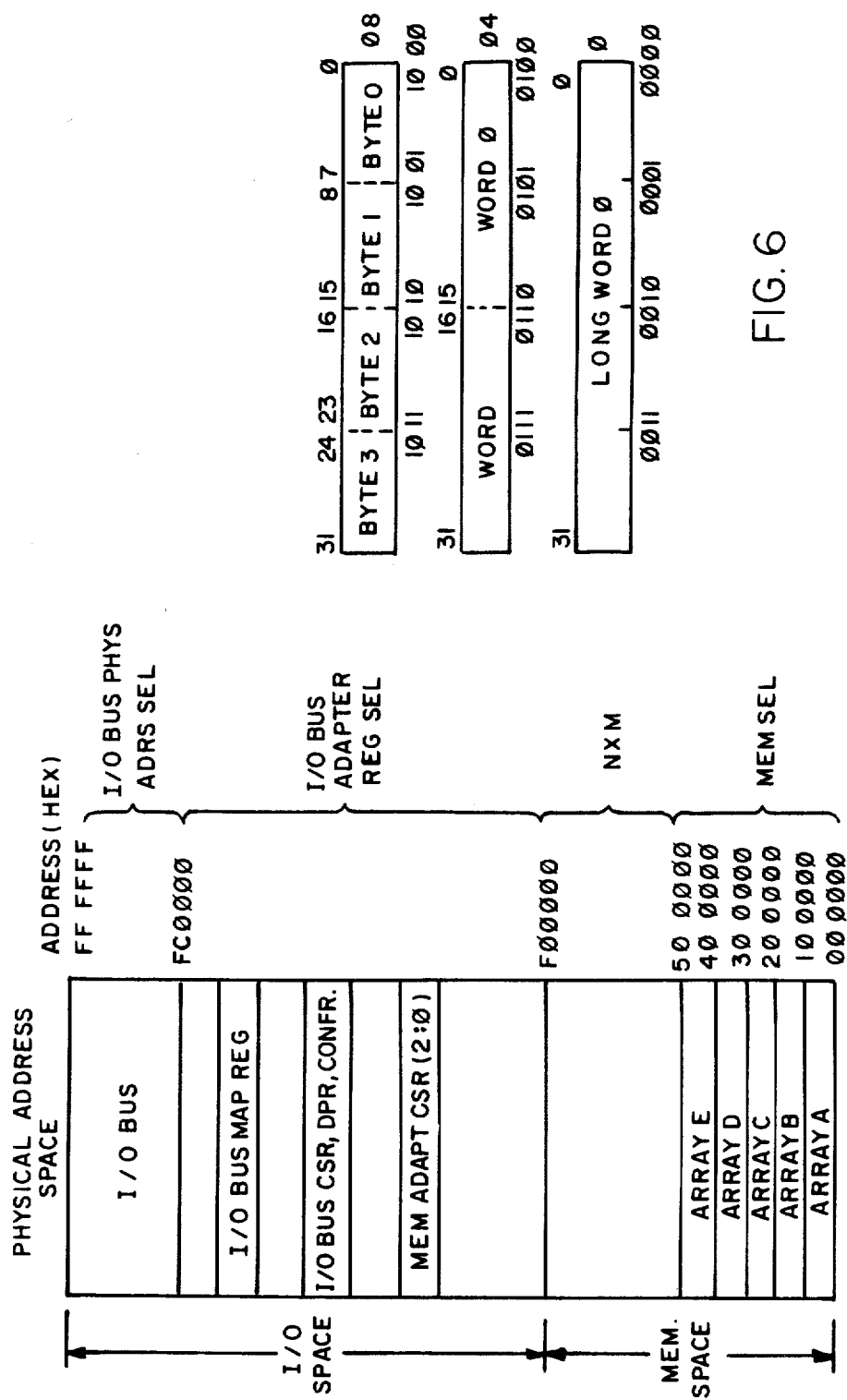
FIG. 5 is a diagram of memory address allocations useful in understanding the operations of a specific embodiment of memory unit 11.
FIG. 6 is another diagram useful in understanding the operation of a specific embodiment of memory unit 11.

FIG. 5 constitutes a map depicting the allocation of translated physical addresses among various possible storage locations, as well as addresses for which no locations are provided. The physical address space has been divided generally into two portions, a portion denominated "Memory Space" that generally has been allocated to locations in arrays 31, and a portion denominated "Input/Output Space" that generally refers, to addressable locations, the contents of which are accessible over input/output bus 16, and some addressable locations located in memory controller 30 itself.

The use of virtual addresses, and their translation to form physical addresses, are techniques that are known in the art. An example is set forth in U.S. Pat. No. 3,854,126, which is assigned to the assignee of this invention, which describes a technique that is similar to the technique used here. In brief, the storage locations of arrays 31 are divided into pages, each of which is identified by a page frame number. The high-order (most significant) bits of the virtual address are used by translation buffer 74 to identify a page frame number, and the nine low-order (least significant) bits of the virtual address are appended to the page frame number to identify the particular addressable location within a page. The low-order bits of the virtual address, without change, form the low-order bits of the physical address.

The memory space, in addition to the addressable locations on arrays 31, also refers to certain addresses and to a certain portion of memory for which locations have not been provided. Specifically, in one embodiment of this invention, a maximum five arrays 31 may be provided, each having a selected number of array locations. In addition to locations which may be provided on the five arrays, a selected number of addresses have been allocated to the Memory Space in addition to those on the five arrays; these addresses are denominated "Non-Existent Memory". Furthermore, if fewer than five arrays are provided in one specific embodiment, then the portion of Memory Space denominated Non-Existent Memory increases to include addresses for those arrays that are not provided. When the memory controller 30 receives an address for which an array location is provided, then physical address decoder 80 (FIG. 3) asserts the ARRAY SEL (E:A) signal. If the address identifies non-existent memory, the decoder 80 asserts the NXM non-existent memory signal.

The Input/Output Space includes all locations which may be written or read by the central processor unit 10 by means of memory controller 30 other than those contained in the Memory Space. Examples of such locations include the registers identified in the aforementioned U.S. Pat. No. 3,999,163 used for controlling a disk or tape secondary data storage facility. Each such register is assigned an address which comprises a portion of the Input/Output Space shown in FIG. 5, and specifically that portion denominated I/O Bus Physical Address. When the memory controller receives such an address, the decoder 80 (FIG. 3) asserts the UB PHYS ADRS SEL input/output bus physical address select signal.

Another portion of the Input/Output Space shown in FIG. 5 is allocated to an Input/Output Adapter Register, which includes memory locations in controller 30 itself, including translation buffer 74 (FIG. 3), the control and status registers 100, 101 and 102 (FIG. 3) and other registers not shown herein.

As a consequence of allocating physical addresses to registers in units connected to the input/output bus 16, as well as to the addressable arrays 31, the central processor unit 10 can transfer information to those registers by transmitting a virtual address that, when translated, constitutes an address in the Input/Output Bus Physical Address Space. If memory controller 30 receives such an address, it initiates a transfer over input/output bus 16 directly. Thus, central processor unit 10 need not be connected directly to input/output bus 16 to make a transfer thereto, but may perform the transfer indirectly through memory controller 30.

The specific process by which the central processor unit 10 communicates with input/output bus 16 through memory controller 30 is described herein below with respect to FIGS. 11A through 11Q.

Before proceeding further, it may be helpful to more particularly describe the address assignments of the sequential memory locations on arrays 31. Specifically, with respect to FIG. 6, each memory location stores a longword of data (FIG. 6A), which constitutes two words (FIG. 6B) or four bytes (FIG. 6C). Each word constitutes two bytes. Each longword is identified by an address, and FIG. 6 depicts three consecutive longword addresses, set forth in hexadecimal in the right-hand side of FIG. 6. The address of the longword corresponds to the address of the least significant byte of each longword. Adjacent to each byte of the three longwords set forth in FIGS. 6A–6C is the byte's physical address, in binary notation. Thus, while the longword in FIG. 6A extends byte addresses 00 to 03 (03 corresponds to 0011 in binary), the entire longword may be addressed by 00. Similarly, the longword shown in FIG. 6C may be addressed by 08 (hexadecimal), while the address of the most significant byte, byte 3 shown in FIG. 6, is "B" (hexadecimal, 1011 binary).

Thus, while each byte is individually identifiable by an address, as shown in FIG. 6, as has been mentioned above the arrays 31 will only transfer data to or from a specific longword at a time.

Adjacent to each longword location in arrays 31, and not shown in FIG. 6, are stored the error correction code check bits which relate to that longword. The check bits are either transferred from the addressed locations of arrays 31 onto array bus 77 during a READ or a WRITE operation, or are received from array bus 77 and stored adjacent to the respective longword.

III. Microcontrol Logic

Figure 7:
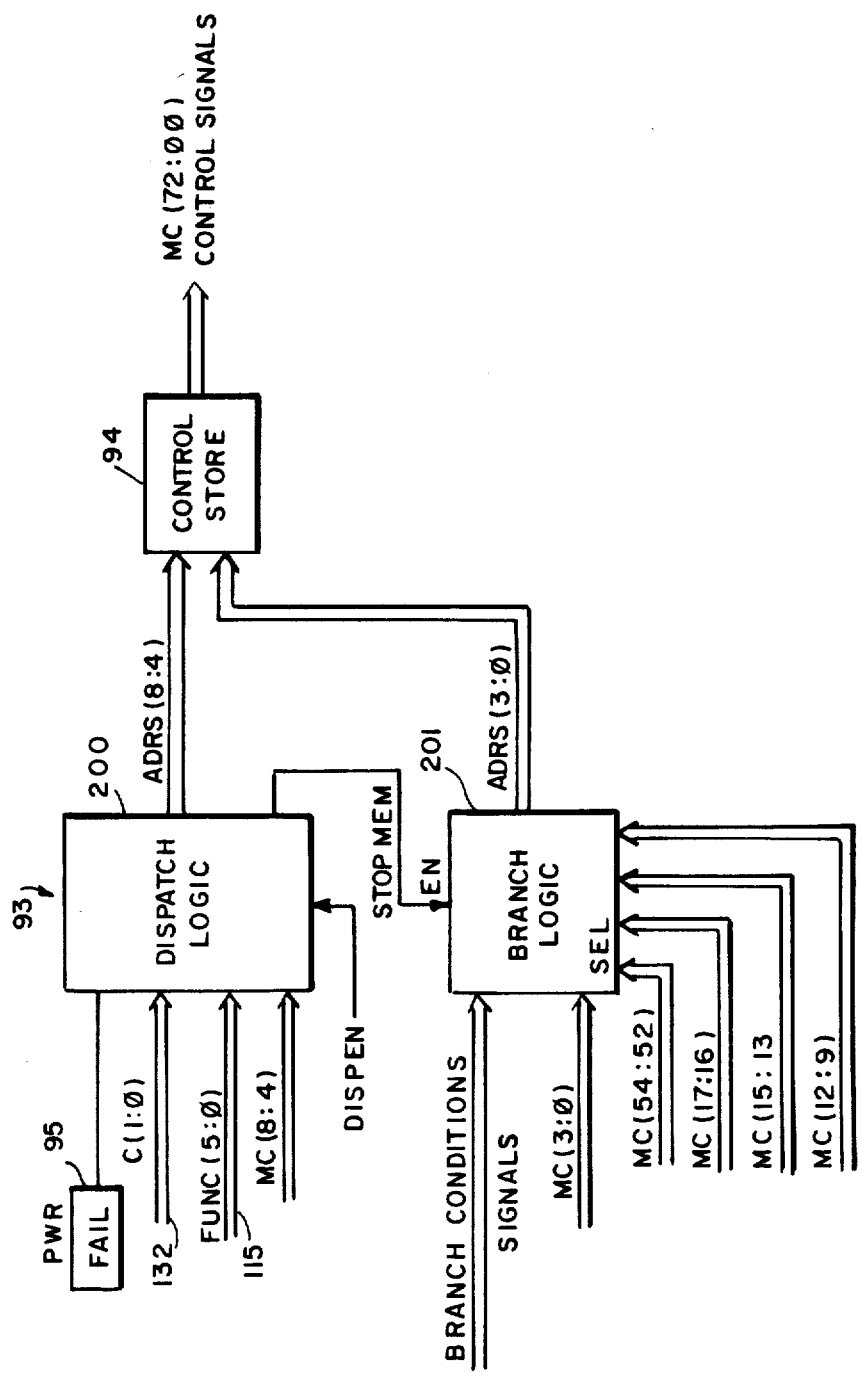
FIG. 7 is a detailed block diagram of a portion of memory unit 11.

FIG. 7 depicts a block diagram of the microcontrol logic for memory controller 30, including power-up and initialization logic 95, memory microsequencer 93 and memory control store 94. Specifically, control store 94 comprises a read-only memory addressed by nine control bits from memory microsequencer 93. The microsequencer 93 comprises a dispatch logic 200 which supplies high order address bits ADRS (8:4) and branch logic 201 which supplies low order address bits ADRS (3:0). Dispatch logic 200 comprises a decoder that receives the command signals from the FUNC (5:0) lines 115 (FIG. 3) from central processor unit 10 and the C(1:0) lines 132 from input/output bus 16, and decodes them to determine the operation to be performed by the memory controller 30. The dispatch logic also receives high order address bits MC (8:4) from a microcontrol word then being transmitted by control store 94. Each microinstruction contains nine bits constituting the next address in the absence of signals from power fail logic 95, a command signal from FUNC (5:0) lines 115 or C(1:0) lines 132, or a branch condition from branch logic 201. The dispatch logic 200 couples either the MC (8:4) signals or signals identified by the dispatch logic command as the high order address bits ADRS (8:4).

Branch logic 201 operates as four multiplexers coupling the low order next address bits from the microinstruction MC (3:0) or the certain branching signals to the control store 94 as low order address bits ADRS (3:0). The branch logic multiplexer select signals are derived from certain bits of the microinstruction, and identify certain signals including certain error signals, or the DATA REQ data request and DATA RCVD data received signals from memory bus 14, or the MSYN and SSYN master and slave synchronization control signals from input/output bus 16, as well as other signals. The assertion or non-assertion of these signals, at various times during a sequence executed by the memory controller 30 in response to a command identified in the dispatch logic 200, conditions the microsequencer to shift to various parts of the sequence or to continue stepping through a sequence in response to a required signal. As explained in more detail below, FIGS. 11A through 11Q depict sequences by which memory controller 30 executes a READ command and a WRITE command.

1. Control and Status Registers

Figure 8A:
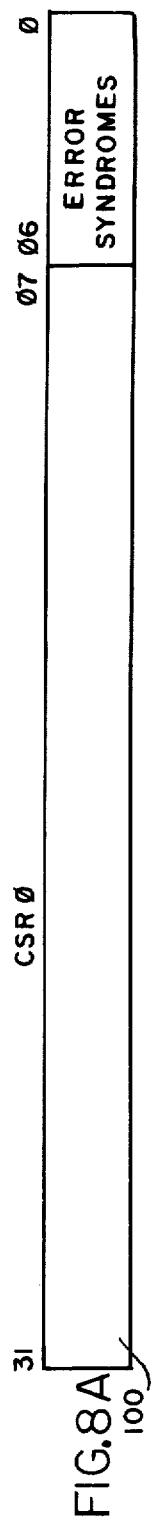
FIG. 8 is a detailed diagram of control and status registers in memory unit 11, depicting the allocation and interpretation of the various stages of the registers.
Figure 8B:
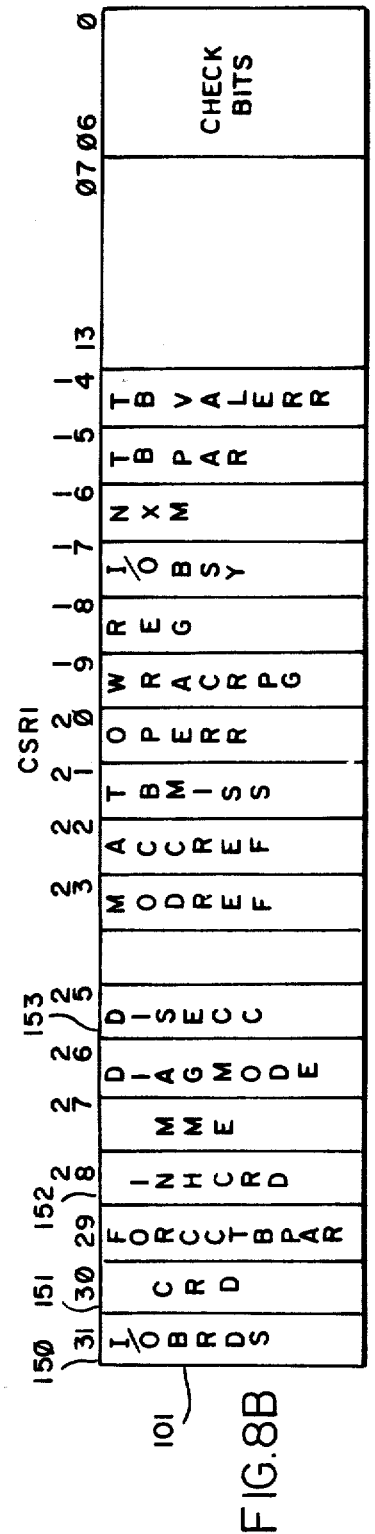
Figure 8C:
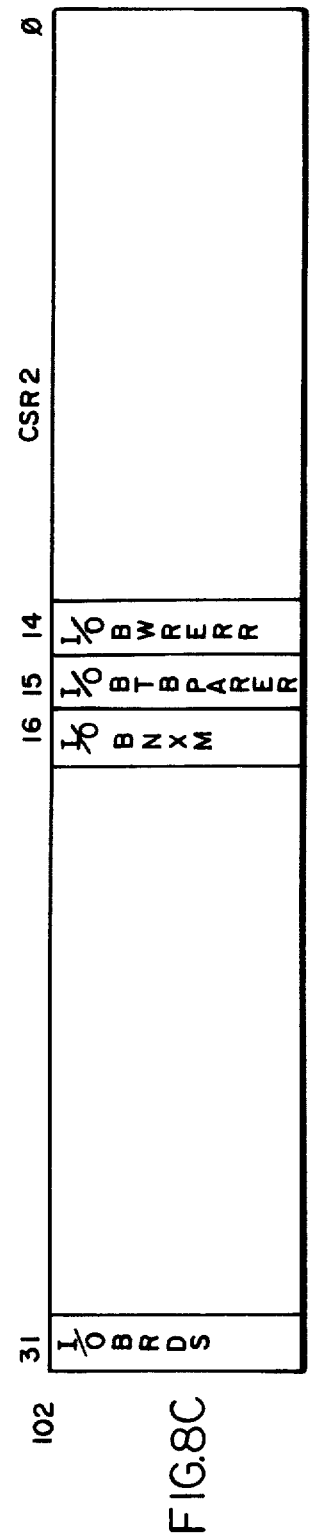

The control and status register CSR0 100, CSR1 101, and CSR2 102 (FIG. 3) each contain a plurality of stages, as depicted in FIG. 8, which define the operating status of memory controller 30. Certain stages of these registers that help understand the flow diagrams of FIGS. 11A through 11Q will be described here. An explanation of other stages not described is not necessary to an understanding of this invention.

a. CSR0 100

The CSR0 100 control and status register stores, in the seven least significant stages, the error syndromes that are generated by ECC logic 90 if it detects and corrects an error which it is designed to correct. If ECC logic 90 detects an error which it cannot correct, it transfers the check bits themselves to these stages of CSR0 control and status register 100.

b. CSR1 101

The CSR1 101 control and status register contains several stages that are loaded by the central processor unit 10 to condition memory controller 30 to perform or not perform certain operations, particularly relating to error correction and detection by ECC logic 90. For example, CSR1 control and status register 101 contains the following stages relating to error correction and detection by ECC logic 90:

An RDS read data set stage 150 which is set if the ECC logic 90 detects an error which it cannot correct;

A CRD corrected read data stage 151 which is set if the ECC logic 90 detects and corrects an error;

An INH CRD inhibit corrected read data stage 152, which is conditioned by the central processor unit 10, inhibits the CRD corrected read data stage from being set; and A DIS ECC disable error correction stage 153, which is also conditioned by central processor unit 10, disables error correction and detection by ECC logic 90.

When either the RDS read data set stage 150 or the CRD corrected read data stage 151 is set, the ERR SUM error summary signal is asserted to central processor unit 10.

A number of other stages relate to address translation by translation buffer 74:

An MME memory management enable stage 155, conditioned by central processor unit 10, when set enables memory controller 30 (FIG. 3) to translate addresses received from memory bus 15. Otherwise, memory controller 30 uses addresses from physical address register 75;

An ACC REF access refused stage 156 is set if the portion of memory addressed by central processor unit 10 cannot be accessed by the particular program then being run, as determined by the CURR MODE current mode and COMP MODE compatibility mode signals; and A TB MISS translation buffer miss stage 157, when set, indicates that the virtual address could not be translated by translation buffer 74.

When the ACC REF access refused stage 156 or the TB MISS translation buffer miss stage 157 are set, the ERR SUM signal is also asserted to central processor unit 10.

A REG register stage 158 is set if the physical address decoder 80 is asserting the UB ADAPTER REG SEL input/output bus adapter register select signal.

An NXM non-existent memory stage 159 is set if the physical address decoder 80 is asserting the NXM non-existent memory signal.

c. CSR2 102

The CSR2 102 control and status register contains a number of stages that relate to transfers initiated by a unit connected to input/output bus 16. Two stages, an I/O B RDS input/output bus read data set stage 150, and an I/O B NXM input/output bus non-existent memory stage 161 are set under the same conditions as the RDS read data set stage 150 and NXM non-existent memory stage 159, of CSR1 control and status register 101.

2. Arbitration Logic

Figure 9A:
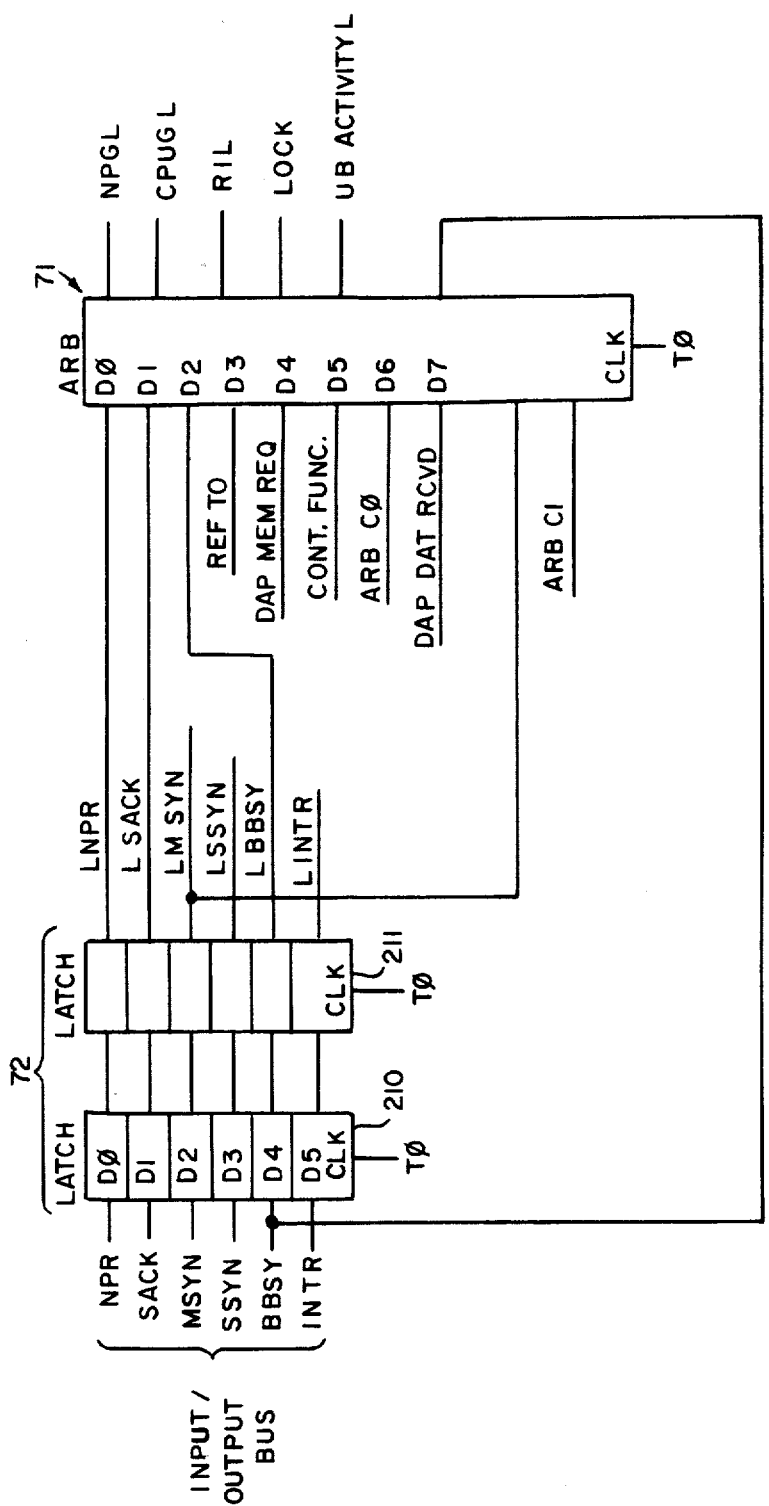
FIGS. 9A and 9B, is a block diagram and a detailed logic diagram, respectively, of circuitry in the memory unit 11 that arbitrates between memory requests from the processor and the input/output bus of FIG. 1.
Figure 9B:
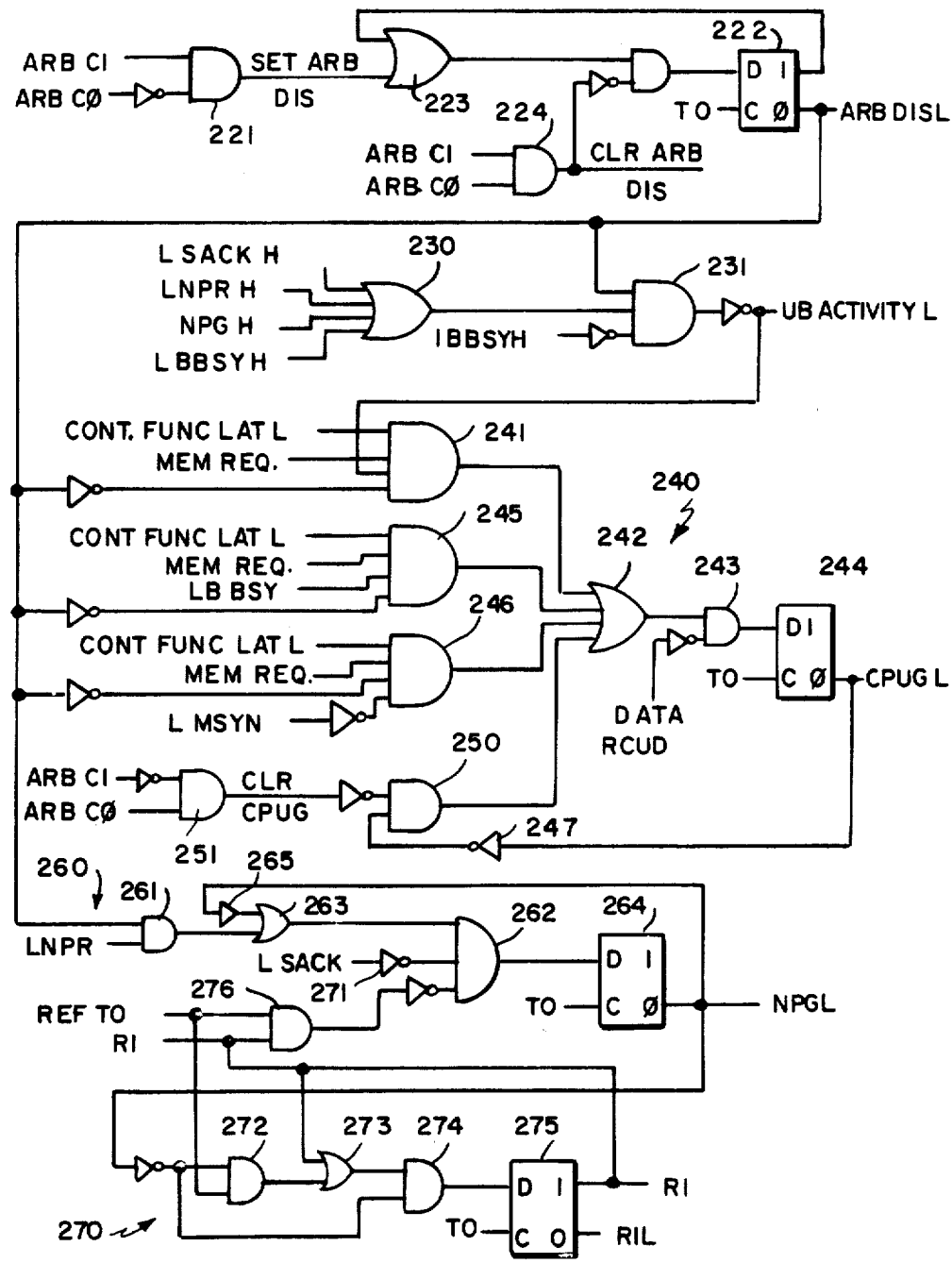

FIGS. 9A and 9B depict circuitry in the arbitration logic 71 and timing synchronizer 72 (FIG. 3).

Timing synchronizer 72 comprises two successive latches 210 and 211 which latch certain signals from input/output bus 16, including the NPR non-processor request, SACK acknowledgement, MSYN master synchronization, SSYN slave synchronization, BBSY bus busy, and INTR interrupt signals, respectively. These signals may be asserted or negated asynchronously with respect to the clocking signals generated by clock generator 67 (FIG. 2). The timing synchronizer 72 transmits a LNPR latched non-processor request signal, LBBSY latched bus busy, and LSACK latched acknowledgement signal to arbitration logic 71.

Arbitration logic 71 also receives the MEM REQ memory request and DATA RCVD data received signals from the central processor unit 10, and ARB C0 and ARB C1 arbitration control signals and a CONT FUNC LAT continuing function latch signal from the microinstructions transmitted by memory control store 94. The ARB C0 and ARB C1 control signals serve to condition arbitration logic 71 to grant priority to memory requests from the input/output bus 16 or from the central processor unit 10, depending on the condition of the signals. The CONT FUNC LAT continuing function latch signal is asserted by the memory control store during operations in which more than one location in arrays 31 must be read or written to complete execution of a command.

FIG. 9B depicts circuitry in arbitration logic 71. In one specific embodiment, arbitration logic 71 is constituted by a programmable array logic device which receives the input signals and generates and transmits signals that depend on the condition of various combinations of the input signals. A certain number of the output signals are transmitted in response to a T0 timing signal from the clock generator 67 (FIG. 2) in central processor unit 10, which signal also clocks latches 210 and 211 comprising timing synchronizer 72.

As was mentioned above, the arbitration logic 71 gives priority to central processor unit 10 or to input/output unit bus 16 in response to the condition of the ARB C0 and ARB C1 arbitration control signals from the memory control store 94. These signals are combined in priority logic 220 which transmits an ARB DIS arbitration disable signal when central processor unit 10 is to have priority, and negates the ARB DIS arbitration disable signal when input/output bus 16 is to have priority. Thus, if the ARB C1 control signal is asserted, and the ARB C0 signal is not asserted, an AND gate 221 asserts a SET ARB DIS set arbitration disable signal that conditions a flip-flop 222 to be set at the next T0 timing signal. A feedback loop through OR gate 223 maintains the flip-flop 222 in the set condition through successive T0 timing pulses, regardless of the condition of the ARB C1 and ARB C0 control signals, until both of the ARB C0 and ARB C1 control signals are asserted. When both ARB C1 and ARB C0 control signals are asserted, an AND gate 224 asserts a CLR ARB DIS clear arbitration disable signal and the arbitration disable flip-flop 222 is then cleared at the next T0 clocking signal.

Arbitration logic 71 also generates an UB ACTIVITY input/output bus activity signal which is asserted in response to the assertion of certain signals on the input/output bus 16. Thus, if the LSACK latched selection acknowledge signal, LNPR latched non-processor request, NPG non-processor grant, or LBBSY latched bus busy signals are asserted, an OR gate 230 enables an AND gate 231 to assert a UB ACTIVITY input/output bus activity signal, as long as the ARB DIS arbitration disable signal is not asserted and an IBBSY internal bus busy signal is asserted. The IBBSY internal bus busy signal is asserted by the memory controller 30 if it has initiated a transfer over input/output bus 16, normally while processing a command from the central processor unit 10, and conversely is not asserted if another unit connected to input/output bus 16 has initiated a transfer thereover. The UB ACTIVITY signal is not asserted if the ARB DIS arbitration disable signal is asserted, indicating that the central processor unit 10 has priority, or if the IBBSY internal bus busy signal is asserted.

Arbitration logic 71 also includes central processor unit grant logic 240 which transmits the CPUG central processor unit grant signal in response to three conditions, each of which is controlled by an AND gate 241, 245 or 246. First, AND gate 241 enables the CPUG grant signal to be asserted in response to the assertion of the MEM REQ memory request signal from central processor unit 10, if the ARB DIS arbitration disable signal is asserted, which grants priority to the central processor unit, the UB ACTIVITY input/output bus activity signal is not asserted indicating that there is no activity on the input/output bus 16, and if a CONT FUNC LAT signal is not asserted. The CONT FUNC LAT continuing function latch signal is from the microinstructions transmitted by control store 94 (FIG. 7) when memory controller 30 is performing a second READ operation or WRITE operation of arrays 31 (FIG. 3). Under these conditions, AND gate 241 couples the MEM REQ memory request signal through OR gate 242 and AND gate 243, if the DATA RCVD data received signal from central processor unit 10, is not asserted. A CPUG grant flip-flop 244 then is set at the next T0 timing signal to assert the CPUG grant signal.

Alternatively, AND gate 245 couples the MEM REQ memory request signal to AND gate 243 through OR gate 242 if the ARB DIS priority signal indicates that the central processor unit has priority and the LBBSY latched bus busy signal is asserted. In the third alternative, AND gate 246 couples the MEM REQ memory request signal to AND gate 243 if the LMSYN latched master synchronization control signal is not asserted and the ARB DIS arbitration disable signal is asserted.

A feedback loop through inverter 247 and AND gate 250 maintains the CPUG grant flip-flop 244 in a set condition through successive T0 timing pulses as long as a CLR CPUG clear CPU grant signal is not asserted. The CLR CPUG clear CPU grant signal is controlled by the ARB C1 and ARB C0 arbitration control signals from the microinstructions transmitted by control store 94. When the ARB C1 signal is negated and ARB C0 signal is asserted, an AND gate 251 asserts the CLR CPUG clear CPU grant signal which, at the next T0 clocking signal, resets flip-flop 244, negating the CPUG grant signal.

Arbitration logic 71 also contains input/output bus control circuitry 260 that transmits an NPG non-processor grant signal over input/output bus 16, in response to an LNPR latched non-processor request signal. If the ARB DIS arbitration disable signal is not asserted, then requests received over the input/output bus have priority, and an AND gate 261 couples the LNPR latched non-processor request signal to an AND gate 262 through OR gate 263. If certain other conditions are met, an NPG flip-flop 264 will assert the NPG non-processor grant signal at the next T0 clocking signal. One such condition is the LSACK latched selection acknowledgement signal not being asserted, which indicates that no other unit connected to input/output bus 16 already is engaging in a transfer over the input/output bus. The LSACK latched selection acknowledgement signal may also be asserted in response to the receipt of a SACK acknowledgement signal from a unit that is transmitted in response to the NPG C non-processor grant signal from flip-flop 264. A second condition is provided by time out circuitry 270, which negates the NPG L non-processor grant signal in the event the LSACK latched selection acknowledgement signal does not do so. The time out circuitry 270 makes use of a REF T0 refresh time out signal that is asserted at the end of each periodic refresh cycle. The refresh cycles proceed regularly, even during certain portions of memory accesses, particularly during arbitration. When the NPG L non-processor grant signal is asserted by NPG flip-flop 264, an AND gate 272, OR gate 273 and a second AND gate 274 couple the REF T0 refresh time out signal to a flip-flop 275. The flip-flop 275 is then set at the next T0 clocking signal to assert an R1 signal. The R1 flip-flop 275 is maintained through successive T0 clocking signals in the set condition by means of a feedback loop through a second input to OR gate 273, until it is cleared as described below. When the R1 flip-flop 275 is set, at the next assertion of REF T0 refresh time out signal, an AND gate 276 disables AND gate 262, which causes NPG flip-flop 264 to be reset at the next T0 timing signal. This negates the NPG signal, which disables AND gate 274, causing R1 flip-flop 275 to be reset at the next T0 timing signal. The NPG flip-flop 264 is maintained in a set condition by means of a feedback loop through inverter 265.

3. Data Rotation

As was mentioned above with respect to FIG. 3, memory controller 30 can receive and process memory requests which require accesses to two adjacent array locations. That is, memory controller 30 can process a READ operation in which it sequentially reads the contents of a first array location and a second adjacent location, and concatenates portions of the contents of both locations and transmits them over memory bus 15 to the central processor unit 10 or to a unit connected to input/output bus 16. Similarly, during a WRITE operation, the memory controller 30 contains circuitry that enables it to load write data into a portion of two consecutive memory array locations.

Specifically, during a READ operation, the read data is coupled from the arrays 31 onto array bus 77 and loaded into the data input latch 87. The data is shifted through ECC error correction logic 90 and stored in data output latch 91. The contents of the data output latch 91 are then coupled onto the array bus 77 and transferred into data alignment logic 85. Data alignment logic 85 and alignment control 96 determine the number of most significant bytes in the longword that is retrieved from the arrays which are to be transmitted to the processor, and loads them into the least significant byte positions of a memory data register in alignment logic 85. The other bytes, which are not to be transmitted to the processor, are stored in the most significant byte positons of the same register.

If necessary the memory controller 30 then initiates a second READ operation of the arrays 31, this time of the contents of the array memory location having the next higher address. The contents of this memory location are transferred onto array bus 77 through data input latch 87, ECC logic 90 and stored in data output latch 91, and from there transmitted onto array bus 77 to data alignment logic 85. Under control of alignment control 96, the data alignment logic 85 rotates the bytes of data so as to transmit those that are to be retained over the most significant lines of memory bus 15. Those bytes stored in the memory data register in data alignment logic 85 from the first READ operation of arrays 31 that are to be returned to the processor in response to the READ command, and the bytes of the second READ operation of arrays 31 that are also to be returned in response to the same READ command, are concatenated in data alignment logic 85 and transmitted onto memory bus 15, for transmission to central processor unit 10, or over input/output bus 16 to input/output units 12.

Alternatively, during a WRITE operation, the WRITE data is received on memory bus 14 and transferred to data alignment logic 85. Under control of the alignment control 96, data alignment logic 85 performs a byte rotation operation in which those bytes of WRITE data that are to be stored in the array location having the lower address, are stored in the most significant byte locations of the memory data register in data alignment logic 85, and the bytes of WRITE data that are to be stored in the array location having the higher address are rotated and stored in the least significant byte locations of the memory data register.

The contents of the memory location of array 31 having the lower address are then transferred onto the array bus, shifted through data input latch 87, and ECC logic 90 and stored in data output latch 91. Those bytes of the WRITE data in the memory data register in data alignment logic 85 that are to be stored in this location are then shifted on to array bus 77, through data input latch 87, ECC logic 90 and are stored in the respective bytes of data output latch 91. The respective bytes of data output latch 91 are enabled by byte select (3:0) signals from alignment control 96. The contents of data output latch 91 are then shifted onto array bus 77, through data input latch 87 and ECC logic 90 to generate the ECC checkbits, and stored in data output latch 91 again, and then are stored in the appropriate location in arrays 31. The array location having the next address is then read and shifted onto array bus 77, and the same process is performed.

Figure 10C:
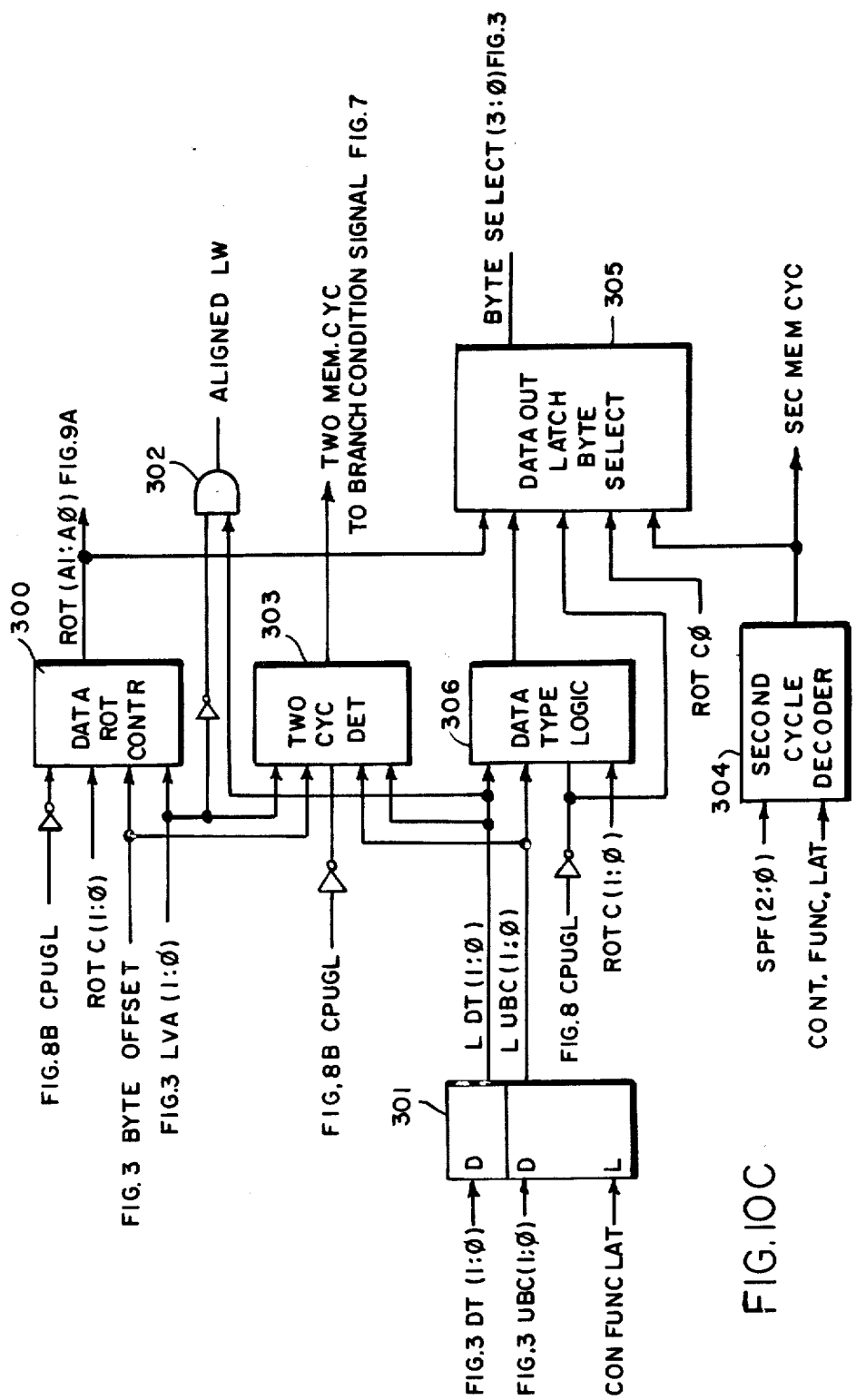
FIG. 10, comprising FIGS. 10A through 10C, contains detailed block diagrams depicting a portion of the data path in memory unit 11.

FIGS. 10A and 10B depict circuitry in data alignment logic 85, and FIG. 10C depicts circuitry in alignment control 96. Specifically, with respect to FIG. 10C, the alignment control 96 generates a number of control signals. One such signal, a rotation control signal ROT (A1:A0) determines the amount by which the READ or WRITE data bytes are to be rotated. An ALIGNED LW aligned longword signal is asserted if the memory transfer satisfies two conditions, namely if the data being transferred constitutes a longword (FIG. 6) and if the data is to be stored (if a WRITE operation) or retrieved (if a READ operation) in only one array location. The alignment control 96 also generates a TWO MEM CYC two memory cycle signal which, when asserted, indicates that two array locations must be accessed, and a SEC MEM CYC second memory cycle signal, which, when asserted, indicates that the memory controller 30 is then in the process of accessing the second memory location. Finally, the alignment control 96 generates the BYTE, SELECT (3:0) signals that enable specific ones of specific byte locations of data output latch 91 to be loaded.

Specifically, alignment control 96 includes a data rotation controller 300 that receives the CPUG grant signal from arbitration logic 71, a BYTE OFFSET signal from translation buffer 74 (FIG. 3), and the LVA (1:0) signals, the two least significant bits of the virtual address stored in virtual address register 73. The two least significant bits of the virtual address also constitute the two least significant bits of the corresponding physical address, and, as shown in FIG. 6, identifies the byte location with respect to which the data is to be transferred. The BYTE OFFSET signal from translation buffer 74 contains the same information for transfers with input/output bus 16.

The data rotation controller also receives two bits of the memory microinstruction from control store 94, ROT C(1:0) rotation clock signal which enables data rotation controller 300 to transmit the ROT (A1:A0) signals at the desired times during the microinstruction sequence. The CPUG grant signal conditions controller 300 to reference the LVA (1:0) signals during a transfer with central processor unit 10 or the BYTE OFFSET signal during a transfer with input/output bus 16.

As can be seen from FIG. 6, if the two least significant bits of the virtual address, LVA (1:0) are both zero, the least significant byte of the longword is addressed and the transfer is considered aligned. If an L DT (1:0) latched data type signal from a flow through latch 301 which corresponds to the DT (1:0) data type signal from central processor 10, indicates that the memory transfer is a longword, an AND gate 302 then asserts the ALIGNED LW aligned longword signal.

A two cycle detector 303 determines from the BYTE OFFSET and LVA (1:0) virtual address signals, and the L DT (1:0) data type and L UB C(1:0) input/output bus control signals whether memory controller 30 must perform two transfers with arrays 31 to the memory operation. The CPUG grant signal is coupled to the two cycle detector logic 303 to enable it to make use of the LVA (1:0) virtual address signal and L DT (1:0) latched data type signals if the memory transfer is with the central processor unit 10, or the BYTE OFFSET and L UB C(1:0) input/output bus control signals if the memory transfer is with the input/output bus 16.

The two cycle detector 303 asserts the TWO MEM CYC two memory cycle signal if more than one array location in arrays 31 must be accessed to perform the transfer. For example, if the L DT (1:0) latched data type signals indicate that a longword is to be transferred, and the LVA (1:0) identifies byte 3 of a memory location (FIG. 6), then transfers with two array locations are required, and the TWO MEM CYC two memory cycle signal will be asserted. For example, during a read operation, in the first memory cycle the most significant byte of the READ or WRITE data will be obtained from byte location 3 of the addressed memory location, and during the second memory cycle the three least significant bytes of the data will be obtained from byte locations 0 through 2 of the array location having the next higher address in memory. The data retrieved from the two locations is concatenated to form the data longword returned to the processor. The most significant byte from the first retrieved memory location forms the least significant byte of the returned longword, and the three least significant bytes from the second retrieved memory location forms the three most significant bytes of the returned longword. Alternatively, if the L DT (1:0) latch data type signal indicates that a byte is to be transferred, the TWO MEM CYC two memory cycle signal will not be asserted since the single byte being transferred can come from or be stored in the most significant byte location in the one array location. The TWO MEM CYC two memory cycle signal causes the branch control logic 201 (FIG. 7) of memory microsequencer 93, to branch to a portion of the sequence to perform a second transfer to an array storage location. During the second array location transfer, the microinstruction from control store 94 contains certain SPF (2:0) special function signals, and controls the assertion of CONT FUNC LAT continuing function latch signal. These signals are received and decoded in a second cycle decoder 304 (FIG. 10C) which transmits the SEC MEM CYC second memory cycle signal. This signal is coupled to a data output latch byte select decoder 305 which transmits the byte select (3:0) signals that enables certain stages of data output latch 91 (FIG. 3). The data output latch byte select decoder 305 also receives the ROT (A1:A0) rotation control signals, and the L DT (1:0) latched data type and L UB C(1:0) latched input/output bus control signals, which identifies the number of bytes involved in the transfer.

As depicted in FIG. 10A, data alignment logic 85 includes the aforementioned memory data register 350 that receives and stores data that is transferred in both directions between memory bus 14 and array bus 77, as it is coupled from a data rotator B 351 or data rotator C 352. A third data rotator, data rotator A 353 is also provided to rotate data during certain operations as described below.

A data rotator is a series of multiplexers that couples one bit at an input from a selected byte of the longword onto the particular bit location of the output. FIG. 10B depicts the multiplexer for the least significant bit of a data rotator. The data signals from the least significant bit of each of the four bytes is transmitted to the input of the multiplexer 354. One of the four data signals is coupled through multiplexer 354 to the least significant bit of the output. The one input signal coupled through the multiplexer is determined by the ROT (A1:A0) rotation control signals from data rotation controller 300 (FIG. 10C). Thus, if the input data signals are not rotated, the signal from the D (00) least significant line from array bus 77 is coupled onto the output of this stage of multiplexer 354. If the data is to be rotated, that is, shifted in the least significant direction by one byte (that is, shifted one byte to the right as shown in FIG. 6, with the least significant byte being shifted into the most significant byte location), then the signal from the D (08) line of array bus 77 is coupled to the output of multiplexer 354.

With reference again to FIG. 10A, during a WRITE operation, WRITE data is transferred over the data D (31:00) lines of memory bus 15 through data rotator C 352. Data rotator C is enabled by AND gate 355. During a write operation an MDR DAT OUT EN memory data register data out enable signal from the microcontrol store 94 (FIG. 7) is not asserted, and at this point in the sequence the SEC MEM CYC second memory cycle signal from second cycle decoder 304 (FIG. 10C) is also not asserted. Data rotator C 352 rotates and shifts the bytes under control of the ROT (A1:A0) rotation control signals, and transfers them through OR gate 356 and couples them to memory data register 350, where they are stored at the next assertion of the T0 clock signal. During portions of the memory reference sequence in which the contents of the memory data register 94 are shifted out of data alignment logic 85, the microcontrol store asserts a DIR WR BYTE EN direction write byte enable signal, which enables a driver 357 to couple the contents of the memory data register onto array bus 77.

During a READ operation, data rotator A 353 is used if the memory reference requires one transfer to a storage location in arrays 31. If two transfers are required, data rotators A 353 and B 351, and memory data register 350 are used. Specifically, if one transfer to arrays 31 is sufficient to complete the memory operation, the TWO MEM CYC two memory cycle signal is not asserted. Thus, data rotator B 351 is enabled, and data from array bus 77 is shifted through data rotator 353 and rotated as required by the ROT (A1:A0) signal from data rotation controller 300 (FIG. 10C). Since the SEC MEM CYC second memory cycle signal is also not asserted, the data from data rotator A 353 is transferred through an AND gate 360, OR gate 361, and line drivers 362 enabled by the MDR DAT OUT EN memory data register data out enable signal from the memory control store 94 (FIG. 3).

However, if two accesses are required to complete a memory operation, the SEC MEM CYC second memory cycle signal is asserted. Thus AND gate 360 is disabled. During the first transfer, an AND gate 363 is energized, since the SEC MEM CYC second memory cycle signal is also not asserted, thereby enabling data rotator B 351. During the first array transfer data from array bus 77 is shifted through data rotator 351 and rotated appropriately, then coupled through OR gate 356 and loaded into memory data register 350 at the assertion of the next T0 clocking signal. During the second transfer from array 31, the SEC MEM CYC signal is asserted by second cycle decoder 304 (FIG. 10C). The SEC MEM CYC second memory cycle signal causes the contents of memory data register 350 to be fed back through AND gate 364 and reloaded in the memory data register at each T0 clock. The second transfer memory data is not shifted through data rotator B 351, as the SEC MEM CYC second memory cycle is now asserted thereby disabling AND gate 363. The second transfer data is coupled through data rotator A 353 and rotated as required by the ROT (A1:A0) rotation control signal. The data is then transferred from data rotator A 353 and shifted through a byte selector A 365. The first cycle memory data is simultaneously shifted from memory data register 350 to byte selector B 366. Both byte selector A 365 and byte selector B 366 respond to the ROT (A1:A0) rotation control signals and transfer only certain portions of the longwords as indicated by these control signals. Thus, selected bytes of each of the longwords from data rotator A 353 and memory data register 350 are shifted through the respective byte selectors 365 and 366. These data signals are shifted through respective AND 367 and 370, as enabled by the SEC MEM CYC second memory cycle signal from second cycle decoder 304, through OR gate 361 and onto memory bus 14 through driver 362.

Thus, it can be seen that the circuitry shown in FIGS. 10A, 10B and 10C enable data received from memory bus 14 or array bus 77 to be shifted into alternate byte locations. This enables memory controller 30 to process memory operations from central processor unit 10 or input/output bus 16 which do not begin at longword boundaries as shown in FIG. 6. This enhances the flexibility of the memory controller 30 by enabling it to make transfers from several storage locations of arrays 31 to execute a single memory operation from memory bus 14 or input/output bus 16.

4. Detailed Flow Diagrams

Figure 11A:
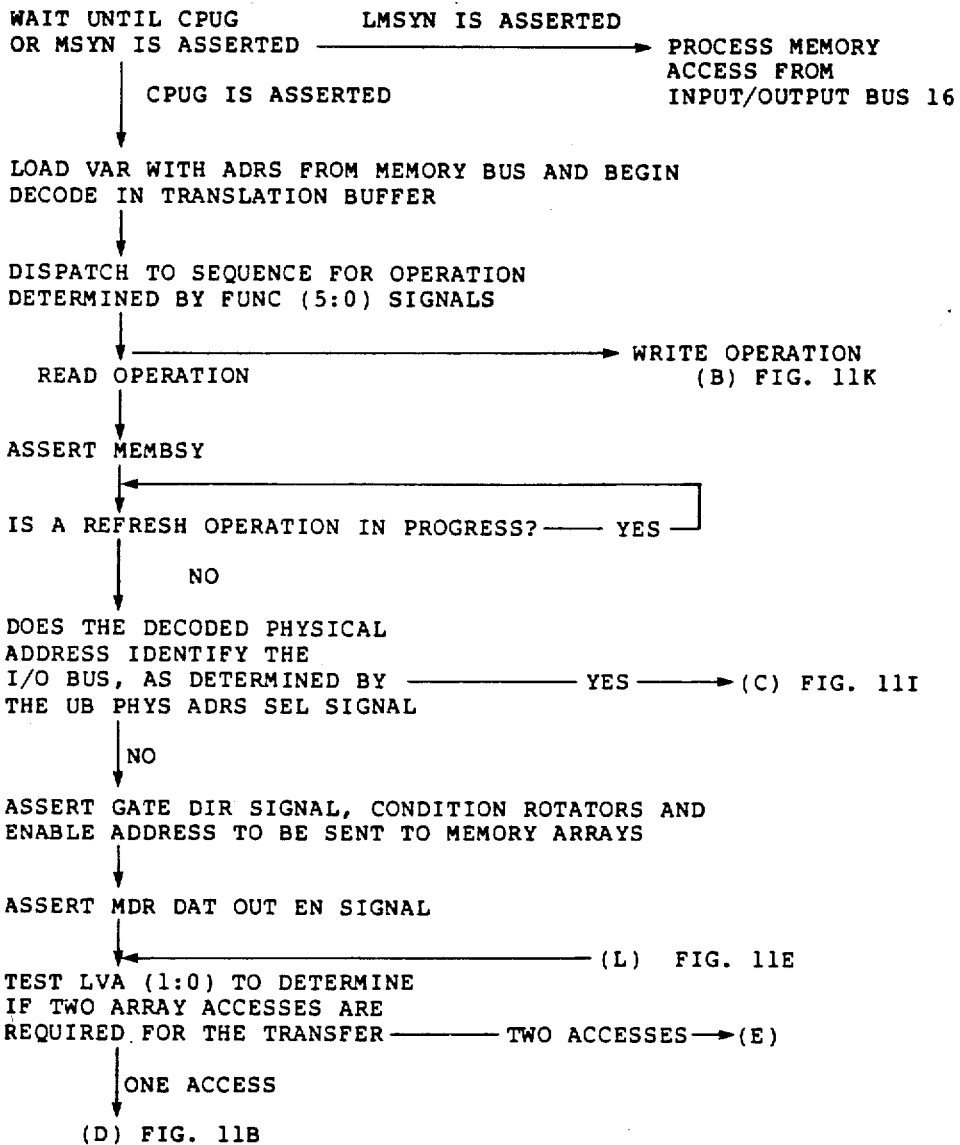
FIG. 11, comprising FIGS. 11A through 11Q, contains detailed flow diagrams depicting the sequence of operations performed by memory unit 11 in response to various commands from processor 10.
Figure 11B:
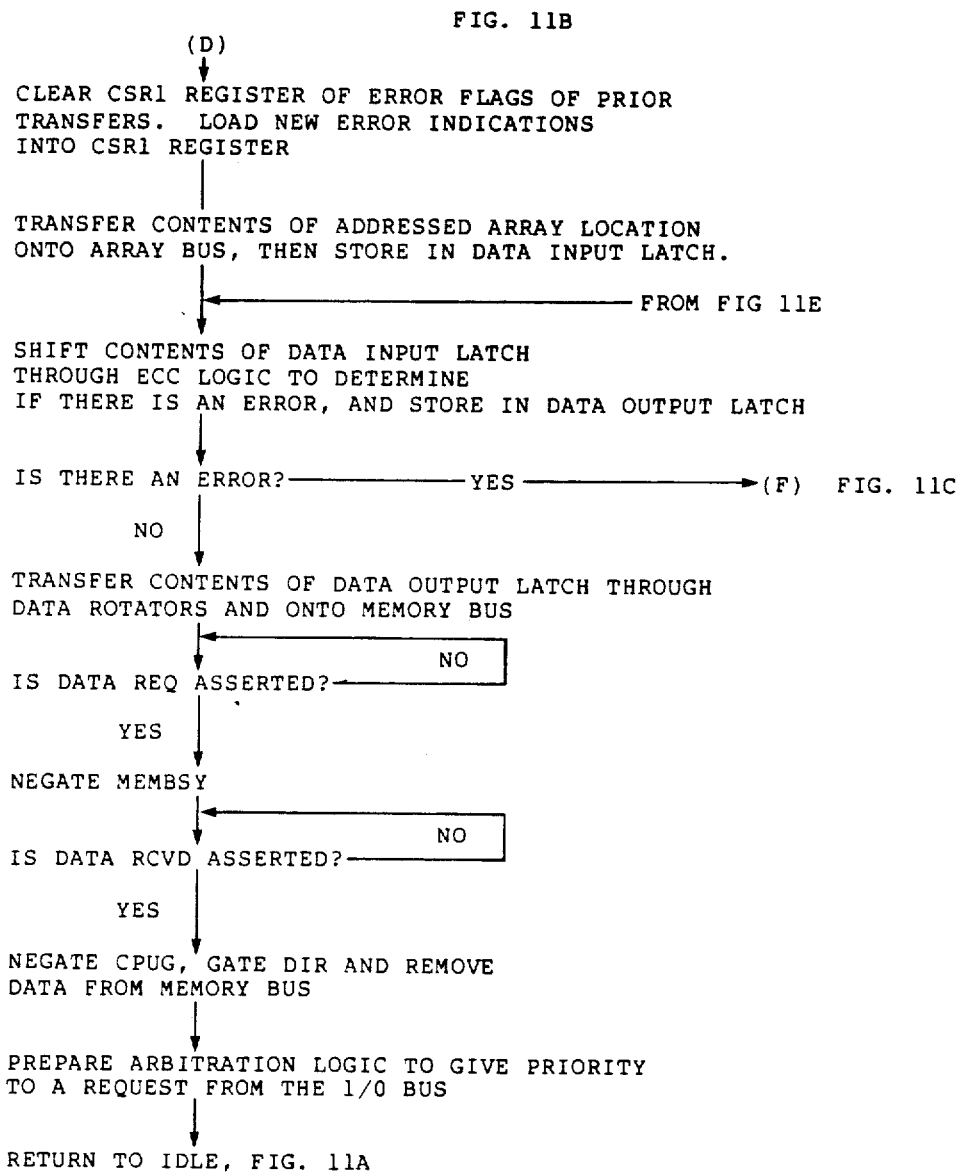
Figure 11C:
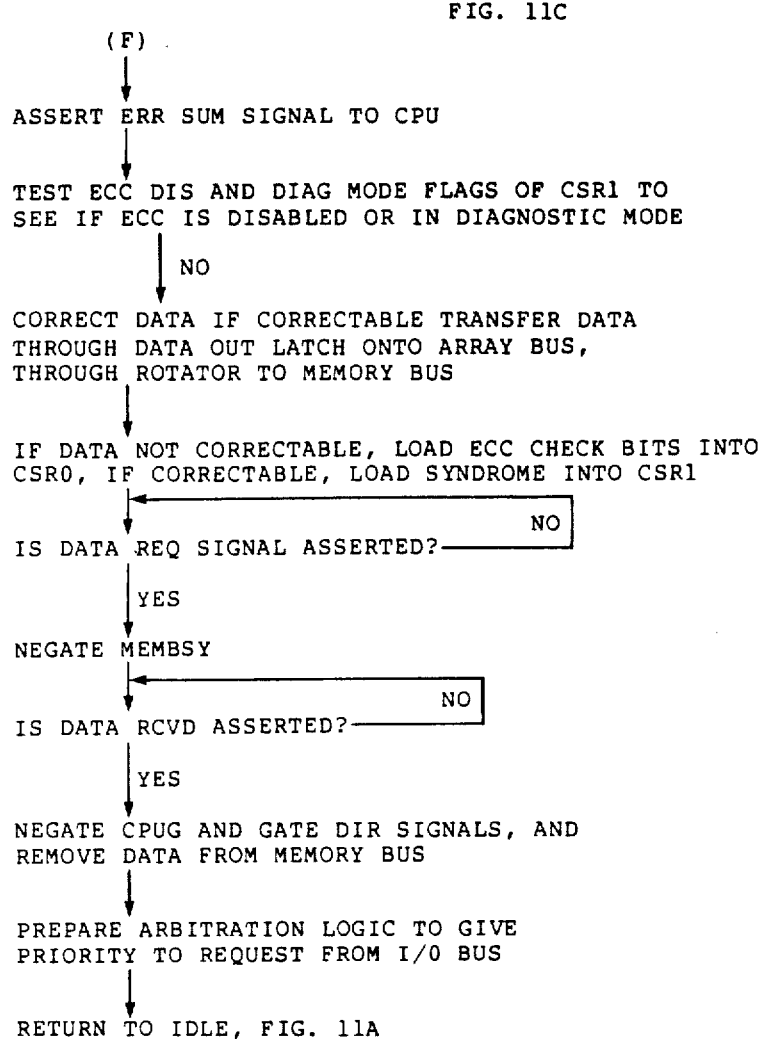
Figure 11D:
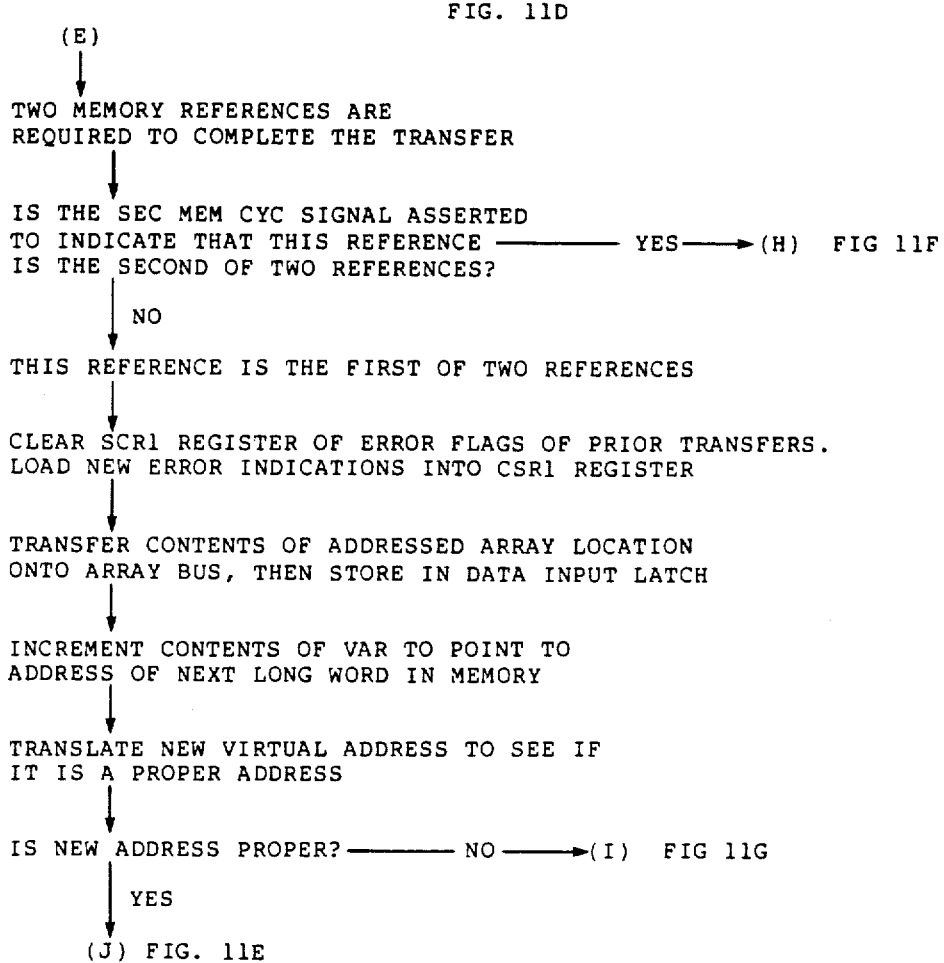
Figure 11E:
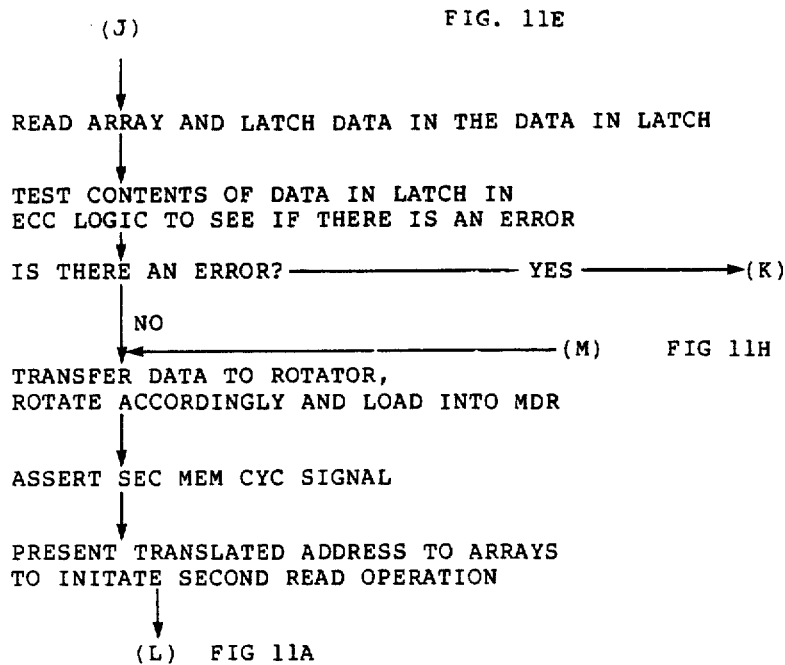
Figure 11F:
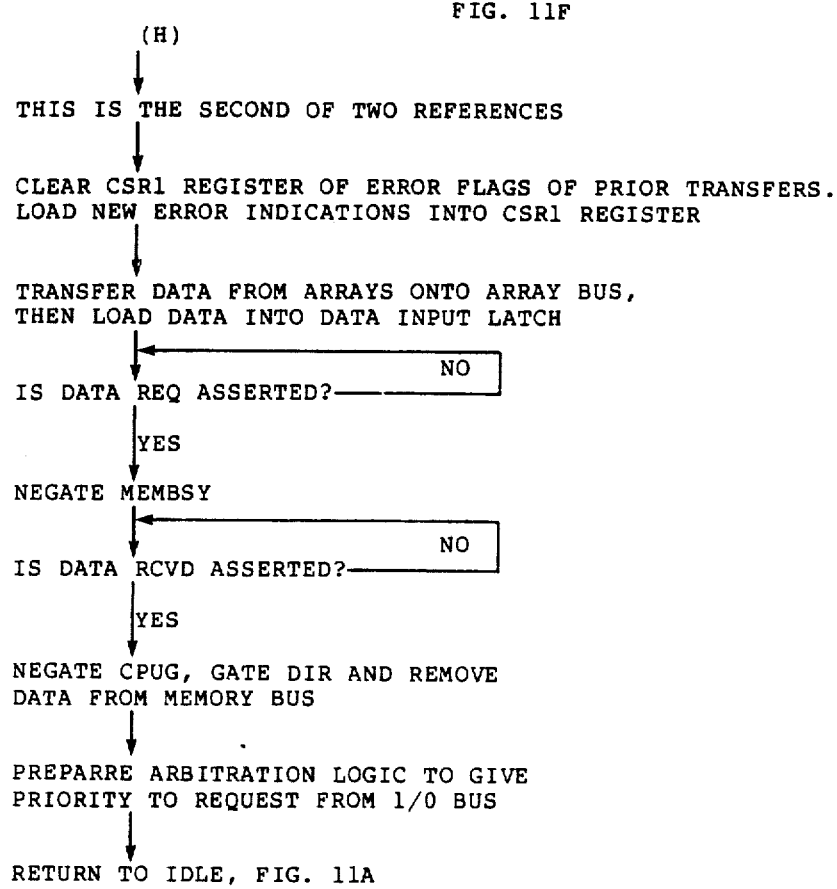
Figure 11G:
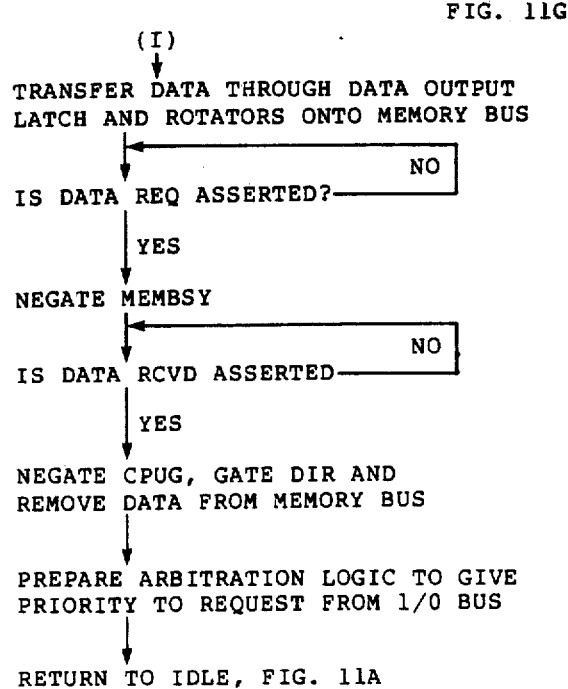
Figure 11H:
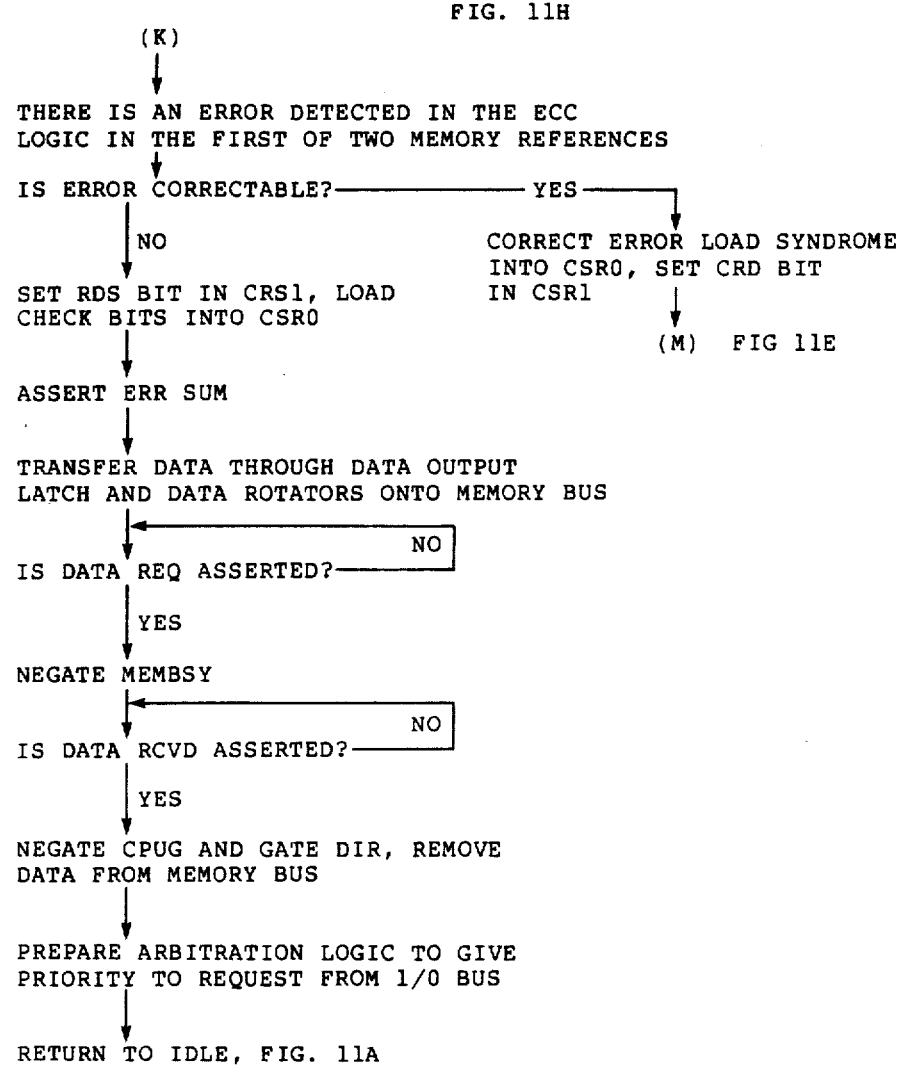
Figure 11I:
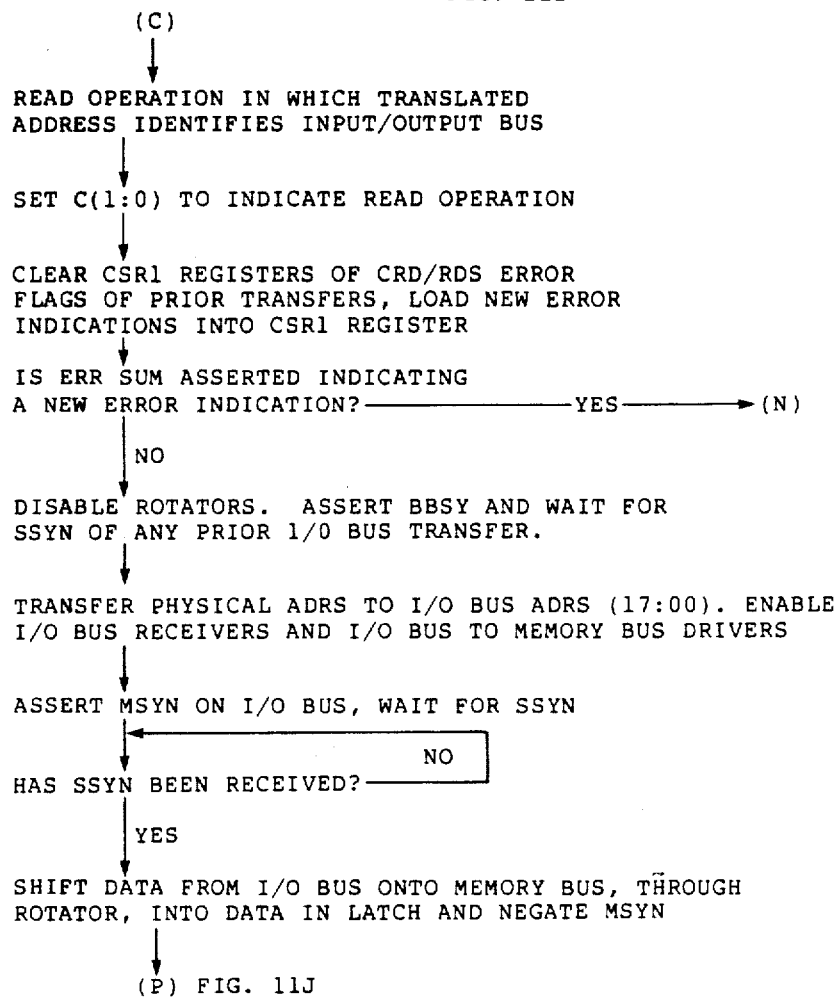
Figure 11J:
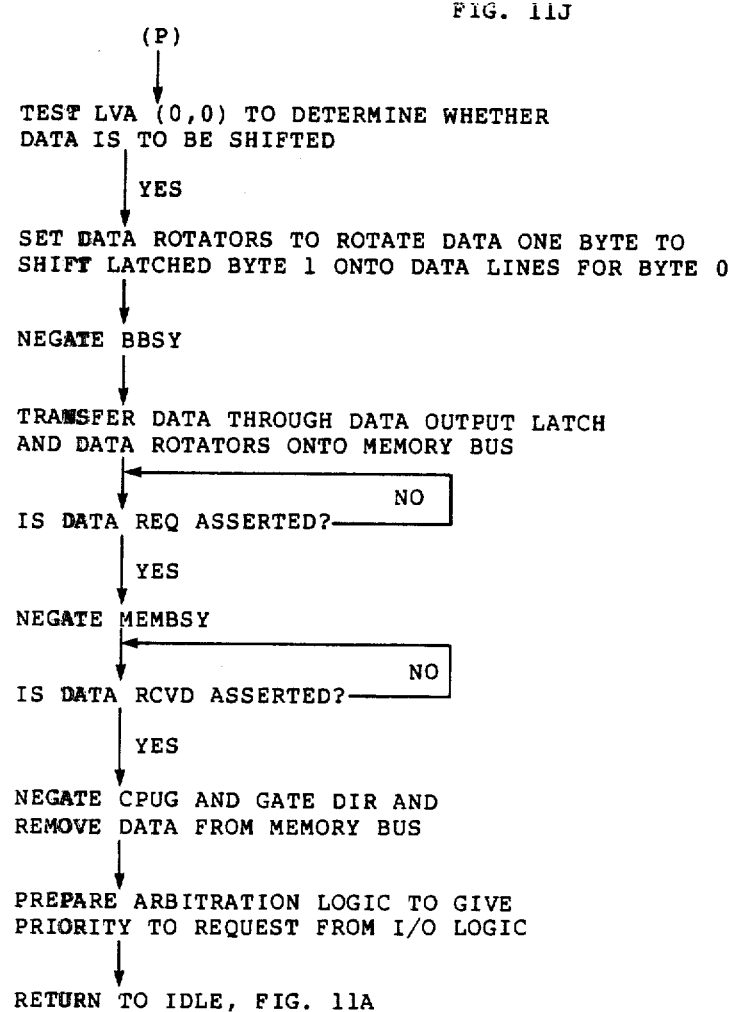
Figure 11K:
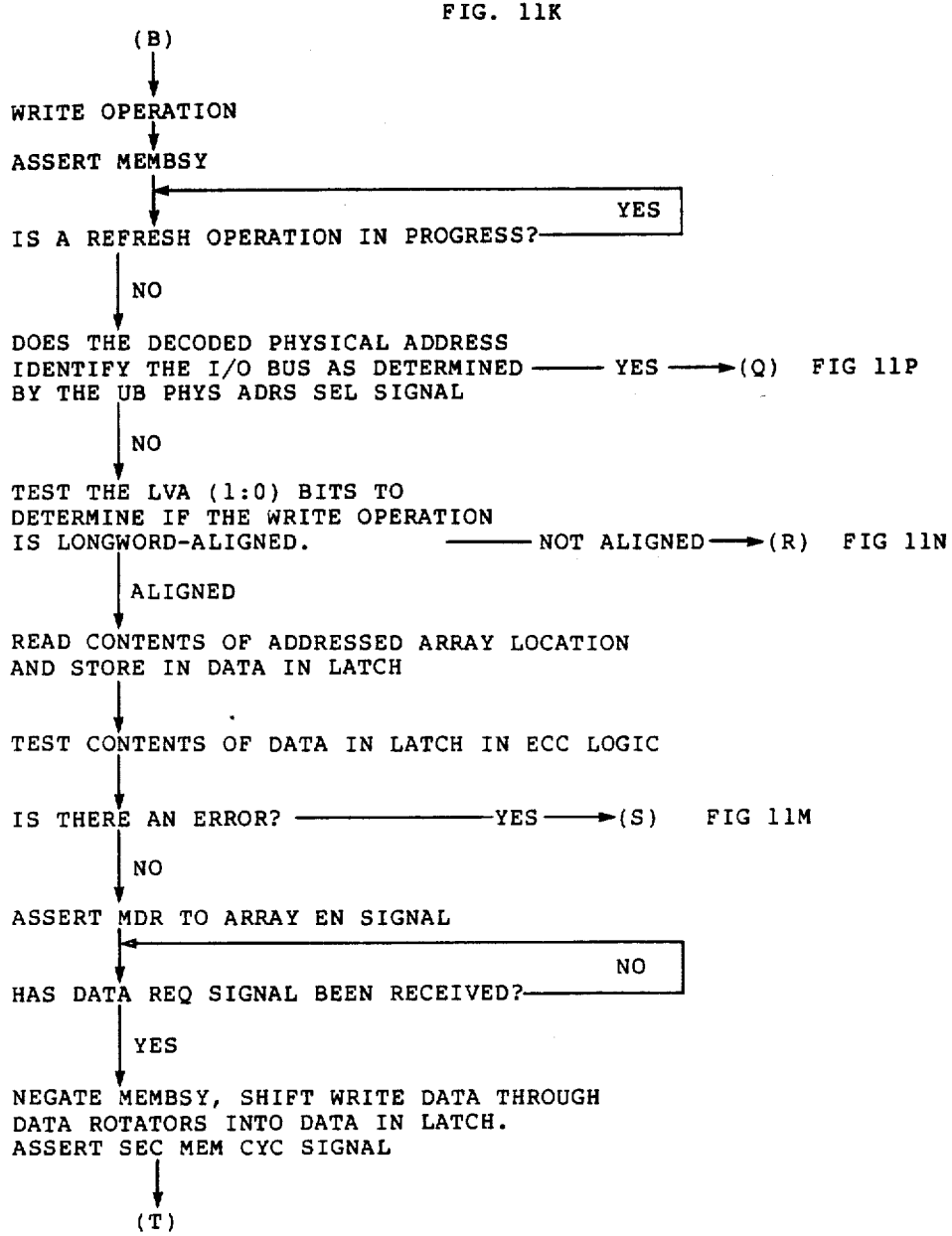
Figure 11L:
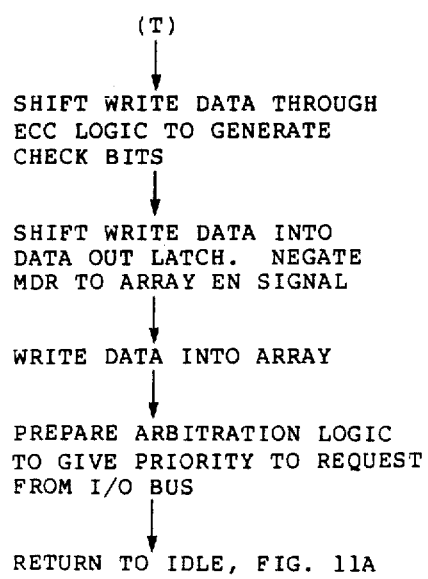
Figure 11M:
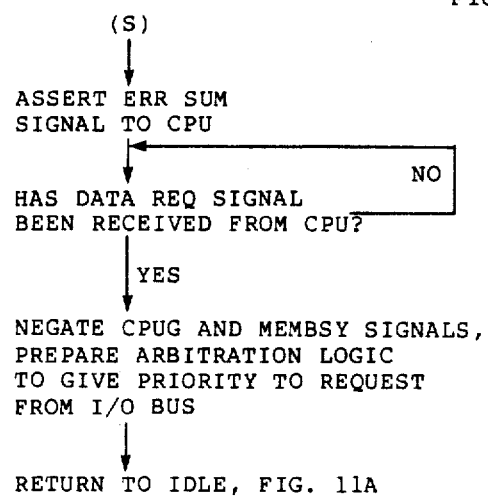
Figure 11N:
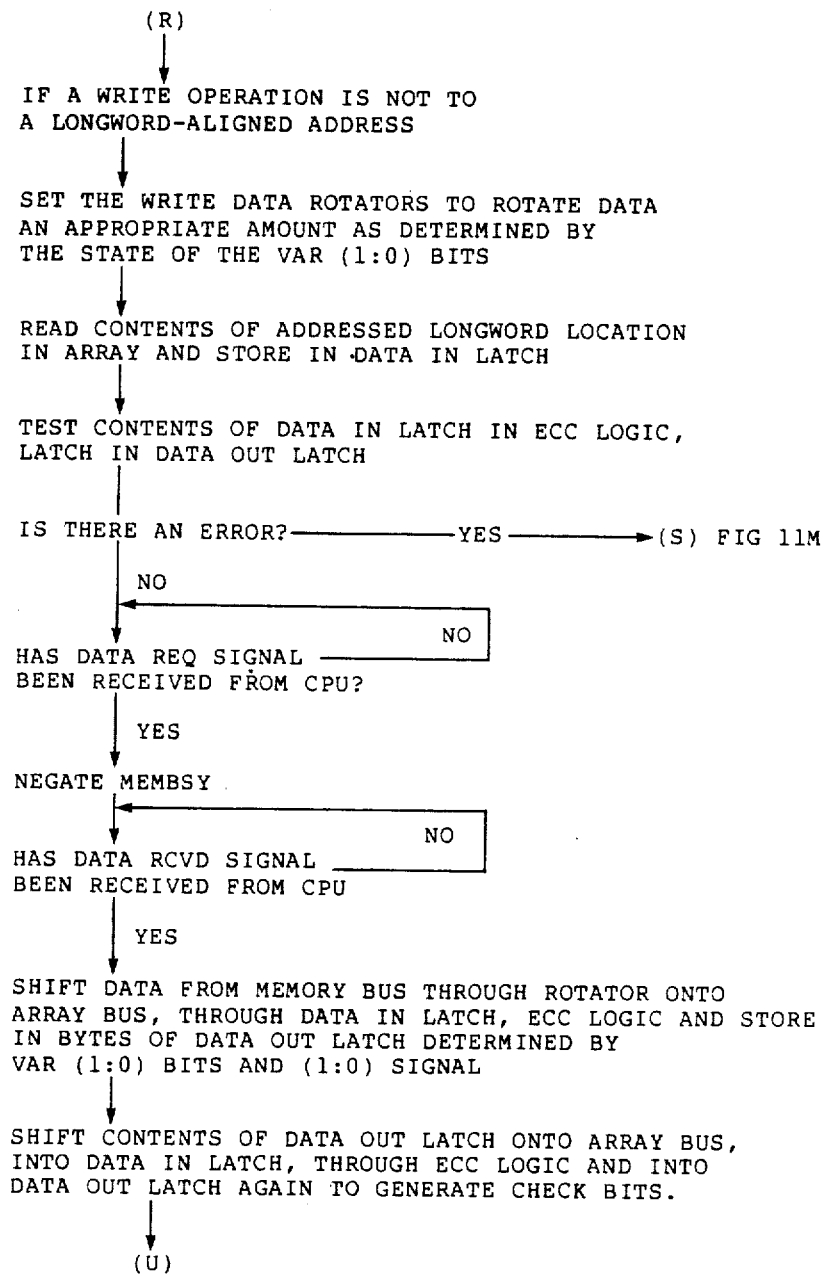
Figure 11O:
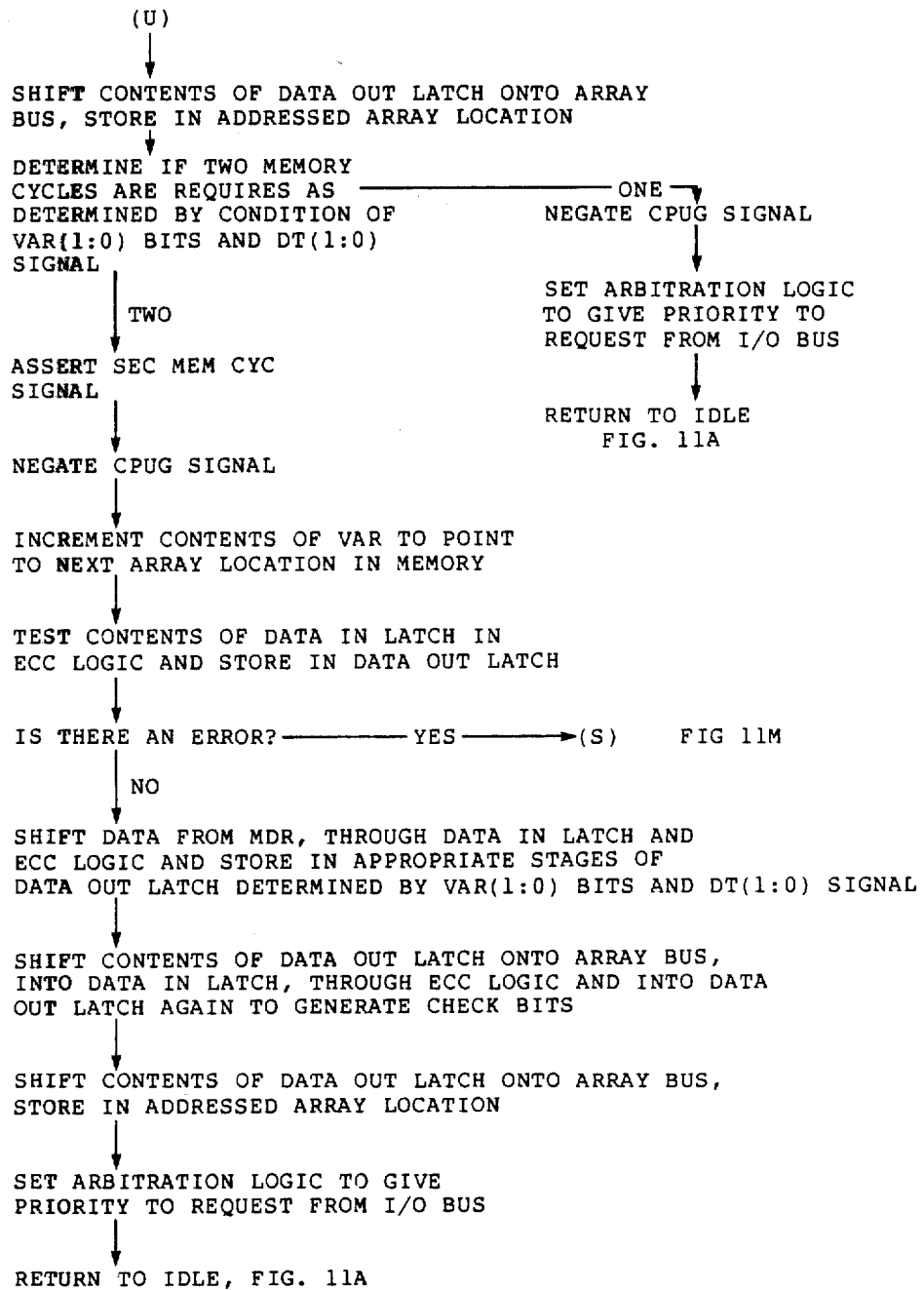
Figure 11Q:
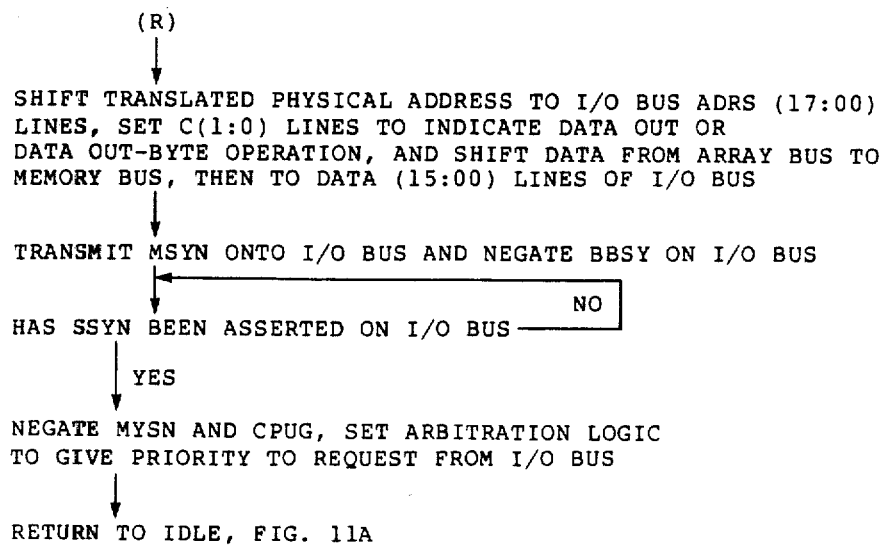

FIGS. 11A through 11Q contain detailed flow diagrams detailing the sequence which memory controller 30 utilizes to perform a READ or WRITE operation. In general, FIGS. 11A and 11B describe a read operation in which two memory cycles are not required to perform the operation.

FIG. 11C constitutes a branch of the sequence from FIG. 11B if an error is detected in the error correction code logic 91 (FIG. 3).

FIGS. 11D through 11H are flow diagrams describing the sequence that the memory controller 30 utilizes to perform a read operation requiring two memory references to complete the transfer.

FIGS. 11I and 11J constitute flow diagrams depicting the sequence that memory controller 30 uses to execute a READ operation in which the translated address from the central processor unit 10 identifies the input/output bus 16.

FIGS. 11K through 11M depict a sequence used by memory controller 30 to perform a WRITE operation in which the ALIGNED LW aligned longword signal from AND gate 302 (FIG. 10C) is asserted.

FIGS. 11N and 11O depict a sequence used by memory controller 30 to perform a WRITE operation in which the ALIGNED LW aligned longword signal from AND gate 302 (FIG. 10C) is not asserted.

Finally, FIGS. 11P and 11Q depict a sequence used by memory controller 30 to transmit write data from the central processor unit 10 to the input/output bus 16.

The FIGS. 11A through 11Q depict the detailed sequence by which the memory controller responds to memory commands from central processor unit 10. This sequence is defined in the indicated figures, and need not be described here.

The foregoing description has been limited to a specific embodiment of this invention. It will be apparent, however, that this invention can be practiced in data processing systems having diverse basic constructions or in systems that use different internal circuitry than is described in this specification, with the attainment of some or all of the foregoing objects and advantages of this invention. Therefore, it is the object of the appended claims to cover all such variations and modifications as come within the true spirit and scope of this invention.

What is claimed as new and desired to be secured by Letters Patent of the United States is:

1. A memory unit for connection in a data processing system including a central processor unit and interconnection means including means for transferring address, control and data signals, the memory unit comprising a plurality of addressable storage locations each comprising a plurality of identifiable sub-locations and means for transferring data from or into a selected addressable storage location, said memory unit further comprising:
  A. transfer data signal storage means connected to said data transferring means for storing data signals that have been transferred from or that are to be transferred into an addressable storage location;
  B. rotation means connected to said interconnection means and to said data transferring means for rotating said data signals in response to the address and control signals;
  C. rotated data signal storage means connected to said rotating means, said transfer data signal storing means, and to said interconnection means for storing said rotated data signals; and
  D. control means connected to said rotated data signal storing means and to said transfer data signal storing means for selectively transferring data signals from said rotated data signal storing means to said interconnection means and to said transfer data signal storing means.

2. A memory unit as defined in claim 1 in which said transfer data signal storage means comprises a storage location having individually-actuable storage sub-locations, and in which said control means further includes means for transmitting control signals to selectively actuate each sub-location to store data signals therein.

3. A memory unit as defined in claim 2 in which said transfer data signal storage means further comprises input latch means for storing data signals and error detection and correction logic connected to said input latch means including first means for receiving and decoding the data signals stored in said input latch means to determine if the data signals contain an error and to correct a detected error, said error detection and correction logic further comprising second means for generating code signals to be used in detecting and correcting an error.

4. A memory unit as defined in claim 1 in which said control signals include data type signals indicating the number of sub-locations of said addressable storage locations with which data signals are to be transferred, said rotation means including:
  A. rotation control means connected to said interconnection means for receiving said data type signals and said address signals for generating a rotation control signal indicating an amount of rotation;
  B. first means connected to said interconnection means and said rotated data signal storing means and to said rotation control means for rotating the data signals received from said interconnection means in response to the rotation control signal from said rotation control means and transmitting the rotated data signals for storage in said rotated data signal storing means;
  C. second means connected to said transfer data signal storing means, said interconnection means and said rotation control means for rotating data signals received from said transfer data signal storing means in response to the rotation control signal from said rotation control means and transmitting the rotated data signals onto said interconnection means; and D. third means connected to said transfer data signal storing means, said rotated data signal storing means and to said rotation control means for rotating data signals received from said transfer data signal storing means in response to the rotation control signal from said rotation control means and transmitting the rotated data signals for storage in said transfer data signal storing means.

5. A memory unit as defined in claim 4 wherein:

A. said rotated data signal storing means further includes means responsive to the rotation control signal from said rotation control means for transferring selected portions of the data signals stored in said rotated data signal storing means representative of the contents of sub-locations identified by the address signals; and B. said second data rotating means further includes means responsive to the rotation control signal from said rotation control means for transferring selected portions of the contents of data signals stored in said transfer data signal storing means representative of the contents of sub-locations identified by the address signals.

6. A memory unit for connection in a data processing system including a central processor unit and interconnection means including means for transferring address, control and data signals, the memory unit comprising a plurality of addressable storage locations each comprising a plurality of identifiable sub-locations and means for transferring data from or into a selected addressable storage location, said memory unit further comprising:

A. transfer data signal storage means connected to the data transferring means for storing data signals that have been transferred from or that are to be transferred into an addressable storage location, said means including a storage location having a plurality of individually-actuable storage sub-locations;

B. rotation means connected to said interconnection means for rotating data signals in response to the address and control signals;

C. rotated data signal storage means connected to said rotation means and said transfer data signal storing means for storing said rotated data signals; and D. control means connected to said interconnection means, said rotated data signal storing means and to said transfer data signal storing means for transferring data signals from said rotated data signal storing means to said transfer data signal storing means, and for transmitting a signal for selectively actuating said storage sub-locations of said transfer data signal storing means storage sub-locations.

7. A memory unit as defined in claim 6 in which said transfer data signal storage means further comprises input latch means for storing data signals and error detection and correction logic connected to said input latch means including first means for receiving and decoding the data signals stored in said input latch means to determine if the data signals contain an error and to correct a detected error, said error detection and correction logic further comprising second means for generating code signals to be used in detecting and correcting an error.

8. A memory unit as defined in claim 6 in which said control signals include data type signals indicating the number of sub-locations of said addressable storage locations with which data signals are to be transferred, said rotation means including:

A. rotation control means connected to said interconnection means for receiving said data type signals and said address signals for generating a rotation control signal indicating an amount of rotation;

B. means connected to said interconnection means and said rotated data signal storing means and to said rotation control means for rotating data signals received from said interconnection means in response to the rotation control signal from said rotation control means and transmitting the rotated data signals for storage in said rotated data signal storing means;

9. A memory unit for connection in a data processing system including a central processor unit and interconnection means including means for transferring address, control and data signals, the memory unit comprising a plurality of addressable storage locations each comprising a plurality of identifiable sub-locations and means for transferring data from or into a selected addressable storage location, said memory unit further comprising:

A. transfer data signal storing means connected to the data transferring means for storing data signals that have been transferred from or that are to be transferred into an addressable storage location;

B. rotation means connected to said transfer data signal storing means and to said system interconnection means for rotating said data signals and for transferring the rotated data signals to the system interconnection means in response to a rotation control signal; and C. control means connected to said system interconnection means, said transfer data signal storing means and said data signal rotating means for generating a rotation control signal in response to the address and control signals from said system interconnection means.

10. A memory unit as defined in claim 9 in which said transfer data signal storage means further comprises a latch means for storing data signals and error detection and correction logic connected to said latch means including first means for receiving the data signals stored in said latch means, decoding them, determining if the data signals contain an error and correcting the detected error, and second means for generating code signals useful in detecting and correcting an error.

11. A memory unit for connection in a data processing system including a central processor unit and interconnection means including means for transferring address, control and data signals, the memory unit comprising a plurality of addressable storage locations each comprising a plurality of identifiable sub-locations and means for transferring data from or into a selected addressable storage location, said memory unit further comprising:

A. transfer data signal storing means connected to the data transferring means for storing data signals that have been transferred from or that are to be transferred into an addressable storage location;

B. first rotation means connected to said transfer data signal storing means for rotating said data signals from said transfer data signal storing means in response to a rotation control signal;

C. rotated data signal storing means connected to the first rotation means for storing the rotated data signals from said first rotation means;

D. second rotation means connected to said transfer data signal storing means for rotating said data signals from said transfer data signal storing means in response to the rotation control signal;

E. gating means connected to said system interconnection means, said rotated data signal storing means and said second rotation means for transferring selected data signals from said rotated data signal storing means and said second rotation means to said system interconnection means in response to the rotation control signal; and F. control means connected to said system interconnection means, said first rotation means, said second rotation means and said gating means for transmitting a rotation control signal in response to the address and control signals from said system interconnection means.

12. A memory unit as defined in claim 11 in which said transfer data signal storage means comprises a storage location having individually-actuable storage sub-locations, and in which said control means includes means for transmitting control signals to actuate each sub-location to store data signals therein.

13. A memory unit as defined in claim 12 in which said transfer data signal storage means further comprises input latch means for storing data signals and error detection and correction logic connected to said input latch means including first means for receiving and decoding the data signals stored in said input latch means to determine if the data signals contain an error and to correct a detected error, said error detection and correction logic further comprising second means for generating code signals to be used in detecting and correcting an error.

14. A memory unit as defined in claim 11 in which said control signals include data type signals indicating the number of sub-locations of said addressable storage locations with which data signals are to be transferred, said control means including means connected to said interconnection means for receiving said data type signals and said address signals for generating a rotation control signal for indicating an amount of rotation.

15. A unit for rotating data to be transferred between a first unit and a second unit in a data processing system in response to a rotation control signal, said rotation unit comprising:

A. first rotation means connected to said first unit for rotating said data signals from said first unit in response to the rotation control signal;

B. rotated data signal storing means connected to the first rotation means for storing the rotated data signals from said first rotation means;

C. second rotation means connected to said first unit for rotating said data signals from said first unit in response to the rotation control signal; and D. gating means connected to the second unit, said rotated data signal storing means and said second rotation means for transferring selected data signals from said rotated data signal storing means and said second rotation means to the second unit in response to the rotation control signal.

16. A rotation unit as defined in claim 15 further comprising third rotation means connected to the second unit and to said rotated data signal storing means for receiving and rotating data signals from the second unit and transferring them for storage to said rotated data signal storing means.

17. A data processing system comprising:

A. system interconnection means including lines for transferring address, control and data signals;

B. a central processor unit connected to said system interconnection means including means for generating address, control and data signals and for transferring them over, and means for receiving data signals from, said respective transfer lines in said system interconnection means;

C. a memory unit connected to said system interconnection means including:
  i. a plurality of addressable storage locations each comprising a plurality of identifiable sub-locations;
  ii. means connected to said addressable storage locations for transferring data from or into a selected addressable storage location;
  iii. transfer data signal storing means connected to said data transferring means for storing data signals that have been transferred from or that are to be transferred into an addressable storage location;
  iv. rotation means connected to said transfer data signal storing means and to said data transfer lines of said system interconnection means for receiving data signals from one of said transfer data signal storing means or said data transfer lines, rotating said data signals in response to a rotation control signal and for transferring the rotated data signals to the other of said data transfer lines or said transfer data signal storing means; and
  v. control means connected to said address and control lines of said system interconnection means, said data transferring means and said rotation means for enabling said data transferring means to retrieve data from or store data in storage locations identified by address signals from said address lines and for generating the rotation control signal for controlling said rotation means in response to the address and control signals from said respective lines of said system interconnection means.

18. A data processing system as defined in claim 17 in which said rotation means includes:

A. first rotation means connected to said transfer data signal storing means for rotating said data signals from said transfer data signal storing means in response to a rotation control signal;

B. rotated data signal storing means connected to first rotation means for storing the rotated data signals from said first rotation means;

C. second rotation means connected to said transfer data signal storing means for rotating said data signals from said transfer data signal storing means in response to the rotation control signal; and D. gating means connected to said system interconnection means, said rotated data signal storing means and said second rotation means for tranferring selected data signals from said rotated data signal storing means and said second rotation means to said system interconnection means in response to the rotation control signal.

19. A data processing system as defined in claim 17 in which said transfer data signal storing means comprises a storage location having individually-actuable storage sub-locations, and in which said control means includes means for transmitting control signals to actuate each sub-location to store data signals therein.

20. A data processing system as defined in claim 19 in which said transfer data signal storing means further comprises input latch means for storing data signals and error detection and correction logic connected to said input latch means including first means for receiving and decoding the data signals stored in said input latch means to determine if the data signals contain an error and to correct a detected error, said error detection and correction logic further comprising second means for generating code signals to be used in detecting and correcting an error.

21. A data processing system as defined in claim 17 in which each storage location in said memory unit includes a plurality of sub-locations and said control signals include data type signals indicating the number of sub-locations of said addressable storage locations with which data signals are to be transferred, said control means including means connected to said interconnection means for receiving said data type signals and said address signals for generating the rotation control signal for indicating an amount of rotation.

* * * * *